(12) United States Patent
Ono

(10) Patent No.: US 9,811,283 B2
(45) Date of Patent: Nov. 7, 2017

(54) SYSTEM, CONTROL DEVICE, AND METHOD

(71) Applicant: FUJITSU LIMITED, Kawasaki-shi, Kanagawa (JP)

(72) Inventor: Takatsugu Ono, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 146 days.

(21) Appl. No.: 15/053,175

(22) Filed: Feb. 25, 2016

(65) Prior Publication Data

US 2016/0283147 A1    Sep. 29, 2016

(30) Foreign Application Priority Data

Mar. 26, 2015  (JP) ................. 2015-064488

(51) Int. Cl.
*G06F 12/00*    (2006.01)
*G06F 3/06*    (2006.01)

(52) U.S. Cl.
CPC ............ *G06F 3/0635* (2013.01); *G06F 3/061* (2013.01); *G06F 3/0631* (2013.01); *G06F 3/0685* (2013.01)

(58) Field of Classification Search
CPC ............................... G06F 3/061; G06F 3/0647
See application file for complete search history.

(56) References Cited

U.S. PATENT DOCUMENTS

| 6,904,470 B1 * | 6/2005 | Ofer ...................... G06F 3/061 |
| | | 710/6 |
| 2004/0194095 A1 | 9/2004 | Lumb et al. |
| 2008/0082777 A1 | 4/2008 | Sakaguchi et al. |
| 2008/0126673 A1 | 5/2008 | Kaneda |
| 2014/0223443 A1 * | 8/2014 | Ashok .................. G06F 9/4881 |
| | | 718/103 |

FOREIGN PATENT DOCUMENTS

| JP | 2006-521640 | 9/2006 |
| JP | 2008-33911 | 2/2008 |
| JP | 2008-84253 | 4/2008 |

* cited by examiner

*Primary Examiner* — David X Yi
*Assistant Examiner* — Arvind Talukdar
(74) *Attorney, Agent, or Firm* — Staas & Halsey LLP

(57) ABSTRACT

A system includes: input-output devices including a first input-output device having a first input-output characteristic and a second input-output device having a second input-output characteristic, and a control device. The control device is configured to when jobs include a first job in which a ratio between reading and writing included in the first job is more suitable for the first input-output characteristic than the second input-output characteristic, a second job having a dependency relationship with the first job and in which a ratio between reading and writing included in the second job is more suitable for the second input-output characteristic than the first input-output characteristic, and a third job having a dependency relationship with neither the first job nor the second job, control submitting order of the jobs into nodes, coupling the input-output devices and the nodes, and copying of execution result data by the jobs between the input-output devices.

20 Claims, 16 Drawing Sheets

FIG. 5

JOBDB

| J-ID | NJ-ID |
|---|---|
| A1 | A2 |
| A2 | A1 |
| B1 | 0 |
| ... | ... |

SVDB

| SV-ID | EXJ-ID | SSD-ID |
|---|---|---|
| SV0 | 0 | 0 |
| SV1 | 0 | 0 |
| SV2 | 0 | 0 |
| SV3 | 0 | 0 |
| ... | ... | ... |

SSDDB

| SSD-ID | RD | WR | EXJ-ID | SV-ID | USE |
|---|---|---|---|---|---|
| SSD0 | 0 | 1 | 0 | 0 | 0 |
| SSD1 | 0 | 1 | 0 | 0 | 0 |
| SSD2 | 0 | 1 | 0 | 0 | 0 |
| SSD3 | 0 | 1 | 0 | 0 | 0 |
| SSD4 | 1 | 0 | 0 | 0 | 0 |
| SSD5 | 1 | 0 | 0 | 0 | 0 |
| ... | ... | ... | ... | ... | ... |

SYSTEM, CONTROL DEVICE, AND METHOD

CROSS-REFERENCE TO RELATED APPLICATION

This application is based upon and claims the benefit of priority of the prior Japanese Patent Application No. 2015-064488, filed on Mar. 26, 2015, the entire contents of which are incorporated herein by reference.

FIELD

The embodiments discussed herein are related to a system, a control device, and a method.

BACKGROUND

A method of constructing an information processing system that satisfies desired performance by coupling a host computer to a given number of storage devices according to the performance the system is desired to meet has been proposed. This kind of information processing system selects a memory area that satisfies performance desired by an application program from plural memory areas possessed by the storage device, and allocates the selected memory area to the host computer.

The storage device mounted in this kind of information processing system includes a hard disk drive (HDD), a flash memory, or both an HDD and a flash memory. In the case of transferring data to the storage device including both an HDD and a flash memory, the information processing system decides data to be transferred to the HDD and data to be transferred to the flash memory on the basis of the access characteristics of the data.

Furthermore, an information processing system including a control device that selectively transfers plural input-output requests held in an input queue to a queue of a storage device in accordance with priority order given to the input-output requests has been proposed. The control device keeps the number of input-output requests held in the queue of the storage device at a target number and adjusts the target number on the basis of a target waiting time until processing of the input-output request is executed and an actual waiting time.

As one example of the related art, Japanese Laid-open Patent Publication No. 2008-84253, Japanese Laid-open Patent Publication No. 2008-33911, and Japanese National Publication of International Patent Application No. 2006-521640 are known.

SUMMARY

According to an aspect of the invention, a system includes a plurality of calculation nodes; a plurality of input-output devices including a first input-output device having a first input-output characteristic and a second input-output device having a second input-output characteristic, each of the plurality of input-output devices being coupled to one of the plurality of calculation nodes; and a control device including a memory and a processor. The memory is configured to store a plurality of jobs. And, the processor is configured to: when the plurality of jobs include a first job in which a ratio between reading and writing included in the first job is more suitable for the first input-output characteristic than the second input-output characteristic, a second job that has a dependency relationship with the first job and in which a ratio between reading and writing included in the second job is more suitable for the second input-output characteristic than the first input-output characteristic, and a third job having a dependency relationship with neither the first job nor the second job, submit the first job into a first calculation node among the plurality of calculation nodes after executing control to couple the first input-output device and the first calculation node, submit the third job ahead of the second job into a second calculation node among the plurality of calculation nodes after completion of execution of the first job, execute control to couple the first input-output device and the second input-output device, execute control to copy execution result data that is stored in the first input-output device and is obtained by the execution of the first job into the second input-output device, execute control to couple the second input-output device and a third calculation node among the plurality of calculation nodes, and submit the second job into the third calculation node after completion of execution of the third job.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates one example of information stored in databases illustrated in FIG. 3;

DESCRIPTION OF EMBODIMENTS

In some cases, plural jobs executed by an information processing system are different in the ratio between reading from and writing to a memory device such as a storage device (reading-writing ratio). Furthermore, among memory devices such as a solid state drive (SSD), products in which the reading performance is higher than the writing performance and products in which the writing performance is higher than the reading performance exist. For example, if a job in which the ratio of writing is higher than the ratio of reading is executed by a memory device in which the writing performance is higher than the reading performance, the processing time is shortened compared with the case in which the job is executed by a memory device in which the reading performance is higher than the writing performance. However, a method of selecting a memory device used for execution of a job from plural memory devices different from each other in the performance on the basis of the characteristics of the job has not been proposed.

The embodiments discussed herein improve the processing efficiency of jobs when plural jobs having characteristics different from each other are executed.

The embodiments will be described below by using the drawings.

Figure 1:
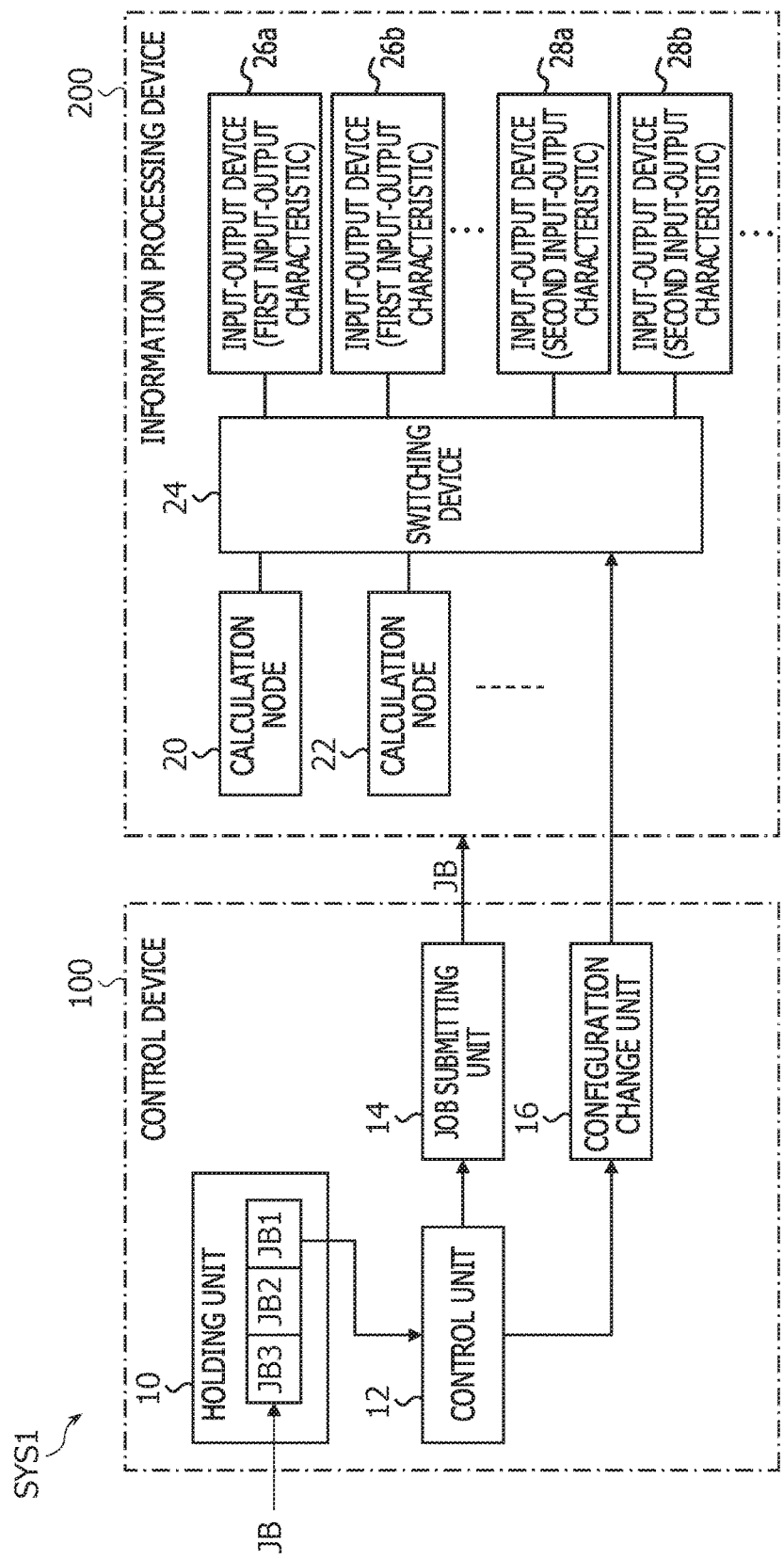
FIG. 1 illustrates one embodiment of an information processing system, a control device and a control method of the information processing system.

FIG. 1 illustrates one embodiment of an information processing system, a control device and a control method of the information processing system. An information processing system SYS1 illustrated in FIG. 1 includes an information processing device 200 and a control device 100 that controls the information processing device 200. The control device 100 includes a holding unit 10, a control unit 12, a job submitting unit 14, and a configuration change unit 16. The information processing device 200 includes plural calculation nodes 20 and 22, a switching device 24, and plural input-output devices 26 (26a and 26b) and 28 (28a and 28b). The respective calculation nodes 20 and 22 include an arithmetic processing device such as a central processing unit (CPU) and a processor and a main memory device such as a dynamic random access memory (DRAM) that stores data processed by the arithmetic processing device.

The input-output devices 26 have a first input-output characteristic and the input-output devices 28 have a second input-output characteristic. For example, the first input-output characteristic is a writing-dominant characteristic in which the writing performance is higher than the reading performance, and the second input-output characteristic is a reading-dominant characteristic in which the reading performance is higher than the writing performance. That is, the first input-output characteristic is a characteristic in which a writing time for writing a given number of pieces of data is shorter than a reading time for reading the given number of pieces of data. The second input-output characteristic is a characteristic in which a reading time for reading a given number of pieces of data is shorter than a writing time for writing the given number of pieces of data. The first input-output characteristic may be a reading-dominant characteristic and the second input-output characteristic may be a writing-dominant characteristic.

The holding unit 10 holds plural jobs JB supplied from the external of the information processing system SYS1. The control unit 12 takes any of the plural jobs JB held by the holding unit 10 and outputs the taken job JB to the job submitting unit 14. The job submitting unit 14 submits the job JB received from the control unit 12 into any of the plural calculation nodes 20 and 22 in accordance with an instruction by the control unit 12. The calculation nodes 20 and 22 execute the submitted job JB by using any of the input-output devices 26 and 28 coupled through the switching device 24. Furthermore, the control unit 12 outputs an instruction to change the coupling between the calculation nodes 20 and 22 and the input-output devices 26 and 28 to the configuration change unit 16. The configuration change unit 16 controls the switching device 24 to change the coupling between the calculation nodes 20 and 22 and the input-output devices 26 and 28 on the basis of the instruction from the control unit 12.

In the example illustrated in FIG. 1, jobs JB1, JB2, and JB3 are held in the holding unit 10 in that order. The job JB1 has a reading-writing ratio more suitable for the writing-dominant characteristic than the reading-dominant characteristic. That is, in the job JB1, the ratio of writing processing is higher than the ratio of reading processing. Therefore, the efficiency is higher when the job JB1 is processed by using the input-output device 26 having the writing-dominant characteristic than when the job JB1 is processed by using the input-output device 28 having the reading-dominant characteristic.

The job JB2 has a dependency relationship with the job JB1 and has a reading-writing ratio more suitable for the reading-dominant characteristic than the writing-dominant characteristic. That is, in the job JB2, the ratio of reading processing is higher than the ratio of writing processing. Therefore, the efficiency is higher when the job JB2 is processed by using the input-output device 28 having the reading-dominant characteristic than when the job JB2 is processed by using the input-output device 26 having the writing-dominant characteristic.

The job JB3 has a dependency relationship with neither the job JB1 nor JB2 and has a reading-writing ratio more suitable for the writing-dominant characteristic than the reading-dominant characteristic. For example, which of the writing-dominant characteristic and the reading-dominant characteristic the reading-writing ratio of each of the jobs JB1, JB2, and JB3 is suitable for is determined on the basis of information supplied together with each of the jobs JB1, JB2, and JB3.

FIGS. 2A, 2B and 2C each illustrate one example of operation of the information processing system SYS1 illustrated in FIG. 1. The control unit 12 determines that the ratio of writing processing in the job JB1 is higher than the ratio of reading processing on the basis of information included in the job JB1 held first in the holding unit 10.

Figure 2:
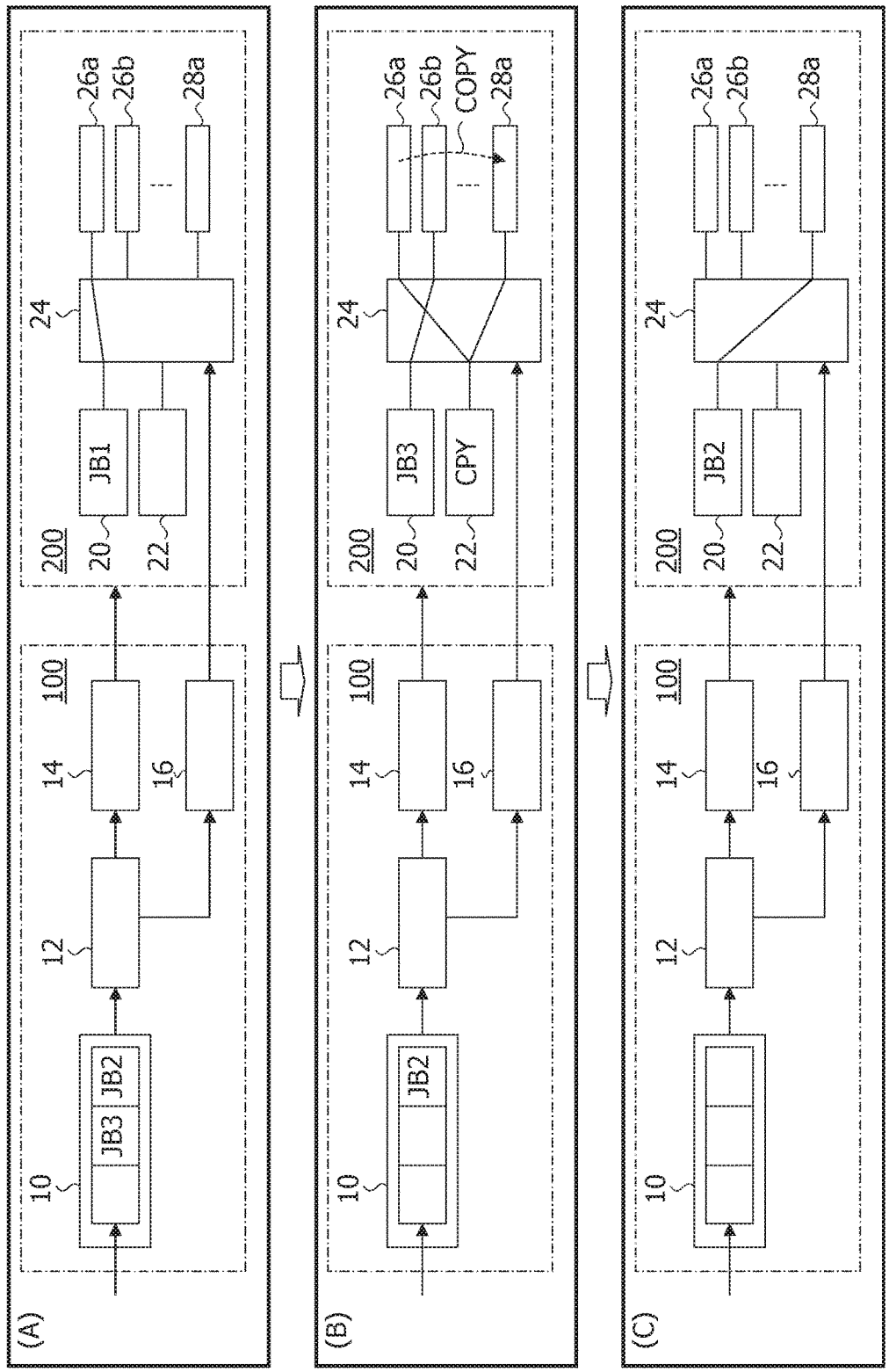
FIG. 2 illustrates one example of operation of the information processing system illustrated in FIG. 1.

Then, as illustrated in (A) of FIG. 2, the control unit 12 causes the configuration change unit 16 to couple the input-output device 26a having the writing-dominant characteristic, in which the writing performance is higher than the reading performance, and the calculation node 20. The control unit 12 takes the job JB1 from the holding unit 10 and submits the taken job JB1 into the calculation node 20 via the job submitting unit 14.

The control unit 12 determines that the job JB2 held in the holding unit 10 subsequently to the job JB1 has a dependency relationship with the job JB1 and the ratio of reading processing in the job JB2 is higher than the ratio of writing processing, on the basis of information included in the job JB2. That is, the control unit 12 determines that the jobs JB1 and JB2 have the dependency relationship with each other and have the reading-writing ratios suitable for the input-output characteristics different from each other, on the basis of the information included in the job JB2. Furthermore, the control unit 12 detects that the job JB3 held in the holding unit 10 subsequently to the job JB2 does not have a dependency relationship with the jobs JB1 and JB2 and the ratio of writing processing in the job JB3 is higher than the ratio of reading processing.

Thus, after the completion of the execution of the job JB1 by the calculation node 20, the control unit 12 causes the configuration change unit 16 to couple the input-output device 26b having the writing-dominant characteristic and the calculation node 20 as illustrated in (B) of FIG. 2. Then, the control unit 12 takes the job JB3 from the holding unit 10 ahead of the job JB2 and submits the taken job JB3 into the calculation node 20 via the job submitting unit 14.

Furthermore, the control unit 12 causes the configuration change unit 16 to couple the calculation node 22 and the input-output devices 26a and 28a, and causes the calculation node 22 to execute copy processing CPY of copying execution result data that is stored by the input-output device 26a and is obtained by the execution of the job JB1 into the input-output device 28*a*. Due to this, the copy processing CPY is executed in the background of the execution of the job JB3 and the time taken for the copy processing CPY is included in the execution time of the job JB3.

After the completion of the execution of the job JB3 by the calculation node 20 and the copy processing CPY by the calculation node 22, the control unit 12 causes the configuration change unit 16 to couple the input-output device 28*a* into which the execution result data of the job JB1 has been copied and the calculation node 20 as illustrated in (C) of FIG. 2. Then, the control unit 12 submits the job JB2 into the calculation node 20 via the job submitting unit 14. The calculation node 20 executes the job JB2, in which the ratio of reading processing is higher than the ratio of writing processing, by using the input-output device 28*a* having the reading-dominant characteristic. Thus, the execution time of the job JB2 is shortened compared with the case in which the job JB2 is executed by using the input-output device 26*a* having the writing-dominant characteristic. Then, the execution of the jobs JB1, JB2, and JB3 is completed.

As above, the information processing system SYS1 illustrated in FIG. 1 executes the jobs JB1 and JB2, which are different from each other in the reading-writing ratio and have the data dependency relationship, by using the input-output devices 26 and 28 different from each other in the reading-writing performance. Furthermore, the information processing system SYS1 executes the copy processing CPY of copying the execution result data of the job JB1 from the input-output device 26*a* into the input-output device 28*a* in the execution of another job JB3.

For example, if the input-output device 26*a* has the writing-dominant characteristic and the input-output device 28*a* has the reading-dominant characteristic, the job JB1, in which the ratio of writing is higher than the ratio of reading, is executed by using the input-output device 26*a*. The job JB2, which has the ratio of reading higher than the ratio of writing and has the dependency relationship with the job JB1, is executed by using the input-output device 28*a* into which the execution result data of the job JB1 stored in the input-output device 26*a* has been copied. This shortens the time until the completion of the execution of the jobs JB1, JB2, and JB3 compared with conventional configurations and improves the processing efficiency of the jobs JB1, JB2, and JB3 compared with conventional configurations. As a result, the performance of the information processing system SYS1 is improved compared with conventional configurations.

Figure 3:
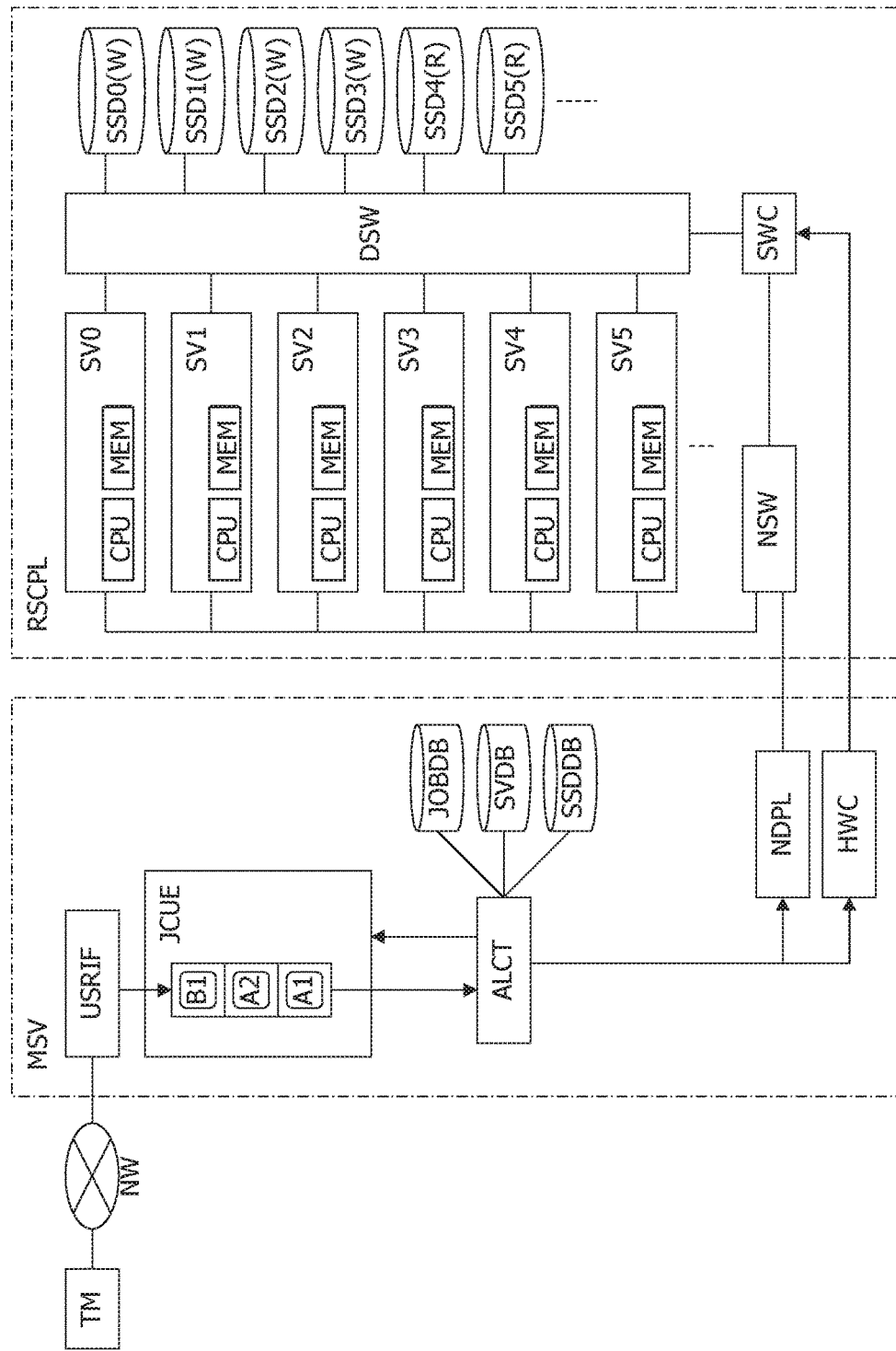
FIG. 3 illustrates another embodiment of an information processing system and a control method of a control device and the information processing system.

FIG. 3 illustrates another embodiment of an information processing system and a control method of a control device and the information processing system. An information processing system SYS2 illustrated in FIG. 3 includes a management server MSV and a resource pool RSCPL.

The management server MSV includes a user interface USRIF, a job queue JCUE, a job allocation unit ALCT, databases JOBDB, SVDB, and SSDDB, a node deployment unit NDPL, and a configuration change unit HWC. The management server MSV is coupled to a terminal device TM operated by a user or the like who uses the resource pool RSCPL via a network NW such as the Internet or an intranet. The management server MSV is one example of a control device that controls the resource pool RSCPL. The management server MSV may be coupled to the terminal device TM without the intermediary of the network NW and may be coupled to plural terminal devices TM via the network NW.

The resource pool RSCPL includes plural servers SV (SV0, SV1, SV2, SV3, SV4, SV5), plural memory devices SSD (SSD0, SSD1, SSD2, SSD3, SSD4, SSD5), and a switch device DSW. Furthermore, the resource pool RSCPL includes a switch control unit SWC and a network switch NSW. The server SV is one example of a calculation node and the memory device SSD is one example of an input-output device and a solid state drive device. The resource pool RSCPL is one example of an information processing device including the servers SV and the memory devices SSD. The number of servers SV mounted in the resource pool RSCPL is not limited to six and the number of memory devices SSD mounted in the resource pool RSCPL is not limited to six.

The terminal device TM is included in a computer device that causes the information processing system SYS2 to execute a job. The information processing system SYS2 executes the job on the basis of an instruction from a user input via the terminal device TM and outputs the execution result of the job to the terminal device TM.

The user interface USRIF receives a job from the terminal device TM and converts the received job to a data format such as the Java_Script Object Notation (JSON; JavaScript is a registered trademark) format to transfer the job to the job queue JCUE. Furthermore, the user interface USRIF transmits the execution result of the job to the terminal device TM. In the management server MSV illustrated in FIG. 3, a functional block and a path for transmitting the execution result of the job to the terminal device TM are not depicted. For example, the job received by the user interface USRIF includes job information indicating the number of servers SV caused to execute the job, the number of memory devices SSD coupled to the respective servers SV, the dependency relationship with a subsequent job, and the access characteristics of the memory device SSD depending on the job.

The user interface USRIF is implemented by a graphical user interface (GUI) that operates on a web browser. The user who operates the terminal device TM uses a GUI screen displayed on the terminal device TM to transmit a job to the information processing system SYS2 and receive the execution result of the job.

The job queue JCUE sequentially holds plural jobs received from the terminal device TM and transfers the held jobs to the job allocation unit ALCT on the basis of instructions from the job allocation unit ALCT. The job queue JCUE is one example of a holding unit that holds plural jobs. FIG. 3 illustrates a state in which three jobs A1, A2, and B1 are sequentially submitted into the job queue JCUE. The jobs A1 and A2 have a dependency relationship with each other and the job A2 is executed by using data obtained by execution of the job A1. The job B1 does not have a dependency relationship with the jobs A1 and A2. The job queue JCUE includes three areas to hold jobs. However, the number of areas to hold jobs may be four or more.

The job allocation unit ALCT stores information on the jobs held by the job queue JCUE in the database JOBDB. An example of the information stored in the database JOBDB is illustrated in FIG. 5.

The job allocation unit ALCT refers to the database JOBDB and the database SVDB and selects the servers SV in the number specified by the information included in the job to be submitted into the resource pool RSCPL as the servers SV that execute the job. Furthermore, the job allocation unit ALCT selects the type suitable to be used for the processing of the job from the plural memory devices SSD on the basis of the access characteristics included in the job.

The job allocation unit ALCT outputs an instruction to construct an environment to execute the job on the selected servers SV to the node deployment unit NDPL. For example, the job allocation unit ALCT outputs, to the node deployment unit NDPL, an instruction to activate the servers SV that execute the job and an instruction to install an application program that executes the job.

The job allocation unit ALCT outputs, to the configuration change unit HWC, an instruction to couple the memory devices SSD in the number specified by the information included in the job among the selected memory devices SSD to the servers SV that execute the job. Then, the job allocation unit ALCT outputs, to the node deployment unit NDPL, an instruction to select one of the jobs held in the job queue JCUE and submit the selected job into the resource pool RSCPL.

The job allocation unit ALCT stores information indicating the coupling relationship between the servers SV and the memory devices SSD coupled by the configuration change unit HWC in each of the databases SVDB and SSDDB. Then, the job allocation unit ALCT manages resources (servers SV and memory devices SSD) in the resource pool RSCPL by using the databases JOBDB, SVDB, and SSDDB. An example of the information stored in the databases SVDB and SSDDB is illustrated in FIG. 5.

On the basis of the instruction from the job allocation unit ALCT, the node deployment unit NDPL deploys a given number of servers SV in the resource pool RSCPL and submits the job received from the job allocation unit ALCT into the deployed servers SV. Here, the deployment of the servers SV refers to selection and activation of the given number of servers SV that execute the job from the servers SV that are not being used. The activation of the server SV includes powering-on and activation of the application program that executes the job. For example, part of the functions of the node deployment unit NDPL may be implemented by Ironic of OpenStack (registered trademark). The node deployment unit NDPL is one example of a job submitting unit that submits a job into any of the plural servers SV.

The configuration change unit HWC controls the switch control unit SWC of the resource pool RSCPL to couple the given servers SV to the given memory devices SSD on the basis of the instruction from the job allocation unit ALCT.

In the resource pool RSCPL, each server SV includes an arithmetic processing device such as a CPU and a main memory device MEM such as a DRAM. Each server SV may include a memory device such as a hard disk drive device that stores an operating system (OS) and application programs. In this case, the servers SV that are not coupled to the memory device SSD via the switch device DSW are also kept at the activated state by using the built-in memory device such as a hard disk drive device.

The switch control unit SWC controls the switch device DSW on the basis of an instruction received from the configuration change unit HWC. The switch device DSW couples any of the servers SV to any of the memory devices SSD on the basis of an instruction from the switch control unit SWC. The switch device DSW is one example of a switching device that switches the coupling between the plural servers SV and the memory devices SSD on the basis of the instruction from the configuration change unit HWC. The switch device DSW may be implemented by using dedicated hardware or may be implemented by using a storage area network (SAN).

The memory devices SSD mounted in the resource pool RSCPL have either a writing-dominant characteristic as an input-output characteristic in which the writing performance is higher than the reading performance or a reading-dominant characteristic as an input-output characteristic in which the reading performance is higher than the writing performance. Hereinafter, the memory device SSD having the writing-dominant characteristic will be referred to as the writing-dominant type and be given (W) at the end. The memory device SSD having the reading-dominant characteristic will be referred to as the reading-dominant type and be given (R) at the end. Although there is no particular limitation, the performance, input/output per second (IOPS), of the memory device SSD of the writing-dominant type is 41 kilo-(K) IOPS in reading and 80 KIOPS in writing. The performance TOPS of the memory device SSD of the reading-dominant type is 75 KIOPS in reading and 12 KIOPS in writing.

The type of the memory device SSD may be classified on the basis of the writing performance in sequential access and the writing performance in random access. Alternatively, the type of the memory device SSD may be classified on the basis of the reading performance in sequential access and the reading performance in random access. Here, the sequential access refers to access to consecutive addresses and the random access refers to access to non-consecutive addresses. Moreover, if the access performance differs depending on the number of accessed blocks, the type of the memory device SSD may be classified on the basis of the access performance depending on the number of blocks. Here, the block is the unit of access based on one time of writing request or one time of reading request.

The network switch NSW mutually couples the servers SV, the switch control unit SWC, and the node deployment unit NDPL. For example, if the servers SV, the switch control unit SWC, and the management server MSV are coupled to each other via a local area network (LAN), the network switch NSW is a LAN switch.

Figure 4:
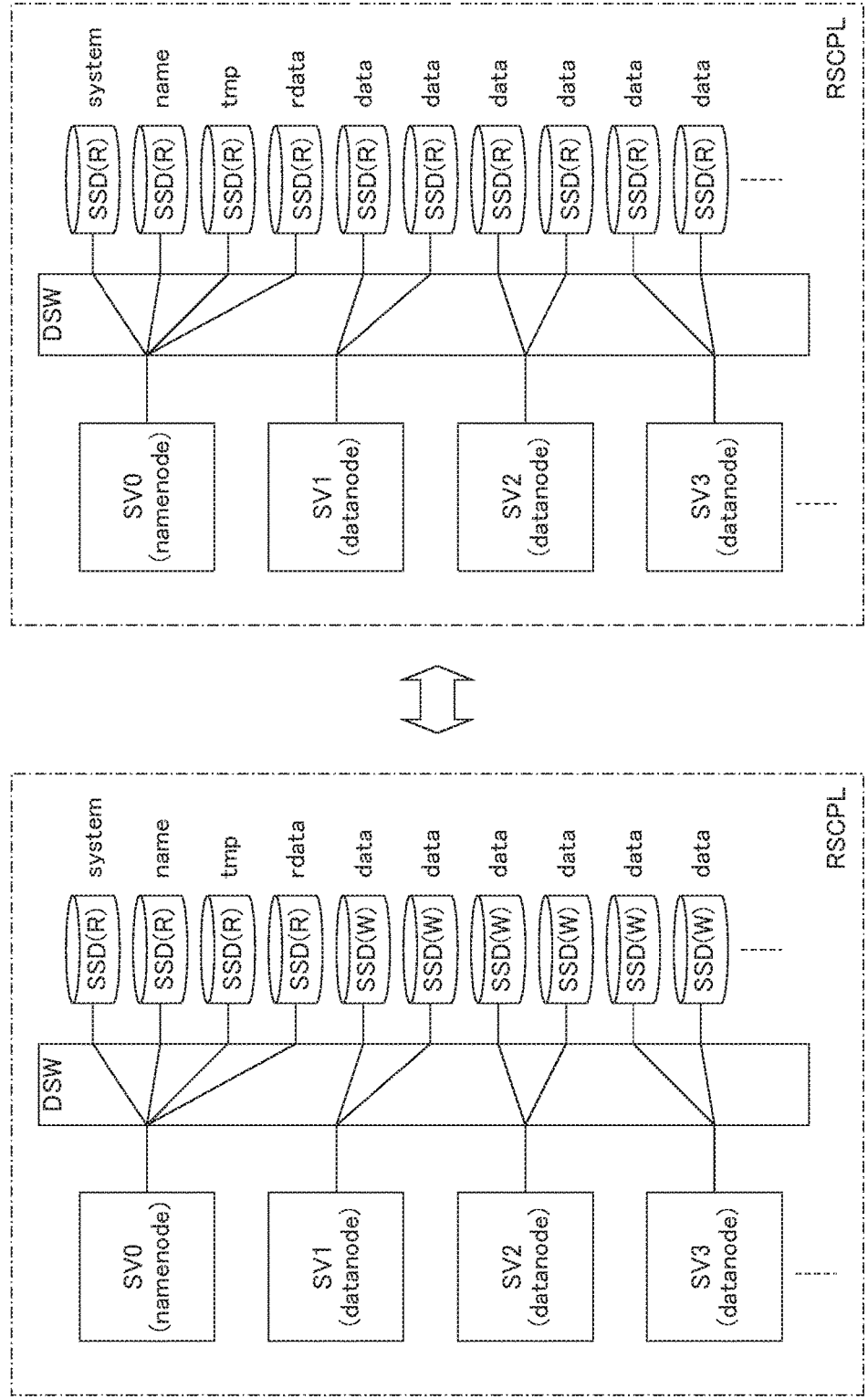
FIG. 4 illustrates examples of a configuration of a resource pool depending on a type of a job in the information processing system illustrated in FIG. 3.

FIG. 4 illustrates examples of configuration of the resource pool RSCPL depending on a type of a job in the information processing system SYS2 illustrated in FIG. 3. The left side of FIG. 4 illustrates a configuration example of the resource pool RSCPL in the case of executing a job in which the ratio of writing access to the memory devices SSD is higher than the ratio of reading access to the memory devices SSD. In the following description, the job in which the ratio of writing access to the memory devices SSD is higher than the ratio of reading access to the memory devices SSD will be referred to as the writing-dominant job. It is preferable that the server SV that executes the writing-dominant job be coupled to the memory device SSD of the writing-dominant type in order to improve the processing efficiency of the job.

The right side of FIG. 4 illustrates a configuration example of the resource pool RSCPL in the case of executing a job in which the ratio of reading access to the memory devices SSD is higher than the ratio of writing access to the memory devices SSD. In the following description, the job in which the ratio of reading access to the memory devices SSD is higher than the ratio of writing access to the memory devices SSD will be referred to as the reading-dominant job. It is preferable that the server SV that executes the reading-dominant job be coupled to the memory device SSD of the reading-dominant type in order to improve the processing efficiency of the job.

FIG. 4 illustrates an example in which Hadoop (registered trademark), which is a software framework that is developed by Apache Software Foundation (Apache is a registered trademark) and is to execute distributed processing of large-scale data, is operated. For example, in the case of operating Mahout (registered trademark) on Hadoop and executing machine learning, writing access is frequently dominant in pre-processing of classifying pieces of data to be processed and reading access is frequently dominant in post-processing of aggregating the classified pieces of data. For example, the pre-processing is map processing of Hadoop and the post-processing is reduce processing of Hadoop.

Therefore, by executing the pre-processing by the resource pool RSCPL with the configuration illustrated on the left side of FIG. 4, writing processing of the classified pieces of data to the memory devices SSD is efficiently executed. Furthermore, by executing the post-processing by the resource pool RSCPL with the configuration illustrated on the right side of FIG. 4, reading processing of the data stored in the memory devices SSD is efficiently executed. For example, in FIG. 3, the job A1 corresponds to the pre-processing of the machine learning and the job A2 corresponds to the post-processing of the machine learning. In FIG. 4, the server SV0 operates as a namenode that manages data of a file system and is coupled to the memory devices SSD of the reading-dominant type. The servers SV1 to SV3 operate as datanodes that input and output processed data from and to the memory devices SSD.

In FIG. 4, the memory devices SSD to which areas "system," "name," and "tmp" are allocated are used by the server SV0, which operates as a parent node. The memory device SSD to which an area "rdata" is allocated holds data before distribution to the memory devices SSD to which areas "data" are allocated (raw data). The memory devices SSD to which the areas "data" are allocated hold data distributed by the servers SV1 to SV3, which operate as child nodes. The number and use purposes of the memory devices SSD coupled to the servers SV0 to SV3 are not limited to the example illustrated in FIG. 4.

FIG. 5 illustrates one example of information stored in the databases JOBDB, SVDB, and SSDDB illustrated in FIG. 3. The databases JOBDB, SVDB, and SSDDB are generated in an initial setting sequence at the time of construction of the information processing system SYS2. The databases JOBDB, SVDB, and SSDDB illustrated in FIG. 5 represent an initial state in which the jobs A1, A2, and B1 are held in the job queue JCUE (state represented in FIG. 3).

The database JOBDB includes an area J-ID in which the identifications (IDs) of jobs submitted into the job queue JCUE are stored and an area NJ-ID in which the IDs of jobs having a data dependency relationship with each other are stored. If another job having a data dependency relationship does not exist, the area NJ-ID is set to "0." The database JOBDB illustrated in FIG. 5 indicates that the jobs A1, A2, and B1 are sequentially held in the job queue JCUE and the jobs A1 and A2 have a data dependency relationship. The job allocation unit ALCT refers to the database JOBDB. Thereby, the dependency relationships between the jobs held in the job queue JCUE are recognized and submitting of the job or suspension of submitting are determined on the basis of the recognition result. The ID of the job stored in the area NJ-ID is one example of dependency relationship information representing the dependency relationship between plural jobs and the database JOBDB is one example of a dependency relationship information memory unit that stores the dependency relationship information.

The database SVDB includes an area EXJ-ID in which the ID of a job in execution by the server SV is stored and an area SSD-ID in which the ID of the memory device SSD coupled to the server SV is stored about each ID of the server SV. If a job is not in execution, the area EXJ-ID is set to "0." If the memory device SSD is not coupled to the server SV, the area SSD-ID is set to "0."

The database SSDDB includes areas RD and WR in which the type of the memory device SSD is stored and an area EXJ-ID in which the ID of a job in execution by the server SV coupled to the memory device SSD is stored about each ID of the memory device SSD. Furthermore, the database SSDDB includes an area SV-ID in which the ID of the server SV coupled to the memory device SSD is stored about each ID of the memory device SSD. Moreover, the database SSDDB includes an area USE in which information indicating that data stored in the memory device SSD is to be used in a subsequent job is stored about each ID of the memory device SSD. The information stored in the area USE is one example of data holding information.

In the areas RD and WR corresponding to the memory device SSD of the writing-dominant type, "0" and "1," respectively, are set. In the areas RD and WR corresponding to the memory device SSD of the reading-dominant type, "1" and "0," respectively, are set. The job allocation unit ALCT refers to the database SSDDB and thereby select the memory device SSD coupled to the server SV in accordance with the type of a job (writing-dominant job or reading-dominant job). The areas RD and WR are one example of dominance information to identify the writing-dominant characteristic (writing-dominant type) or the reading-dominant characteristic (reading-dominant type) about each memory device SSD, and the database SSDDB is one example of a dominance information memory unit that stores the dominance information.

If a job is not in execution, the area EXJ-ID in the database SSDDB is set to "0." If the server SV is not coupled to the memory device SSD, the area SV-ID in the database SSDDB is set to "0." In the area USE, "1" is set if data stored in the memory device SSD is to be used in a subsequent job, and "0" is set if the data stored in the memory device SSD is not to be used in a subsequent job. By setting the area USE in the database SSDDB, the memory device SSD that stores data to be used in a subsequent job having a dependency relationship may be inhibited from being used in another job. As a result, the data to be used in a subsequent job having a dependency relationship may be inhibited from being lost from the memory device SSD.

FIGS. 6 to 13 each illustrate one example of the operation of the information processing system SYS2 illustrated in FIG. 3. For easy understanding of explanation, suppose that, in FIGS. 6 to 13, the number of servers SV is three and two servers SV are used to execute each of the jobs A1, A2, and B1 and one memory device SSD is coupled to each server SV. Furthermore, suppose that one server is used for copy processing of data between the memory devices SSD.

Suppose that processing executed by the jobs A1, A2, and B1 is Hadoop processing and the job A1 is map processing and the job A2 is reduce processing. The processing executed by the jobs A1, A2, and B1 may be another kind of distributed processing other than the Hadoop processing.

Figure 6:
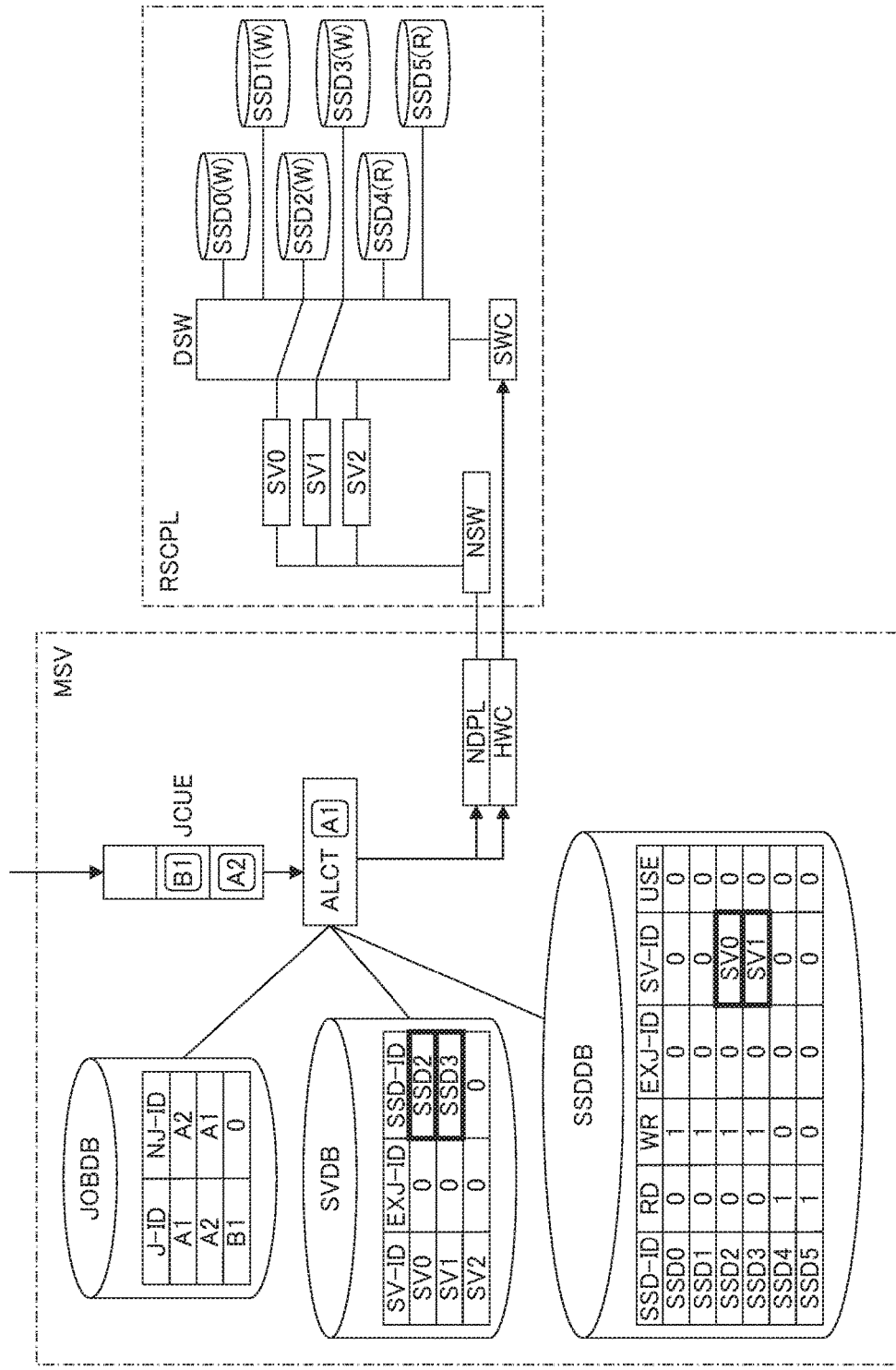
FIGS. 6, 7, 8, 9, 10, 11, 12, and 13 are diagrams illustrating one example of operation of the information processing system illustrated in FIG. 3.

FIG. 6 represents a state subsequent to the initial state illustrated in FIGS. 3 and 5 and illustrates a state in which the job allocation unit ALCT takes the first job A1 from the job queue JCUE and prepares for execution of the job A1. In FIG. 6, areas indicated by heavy-line frames in the databases SVDB and SSDDB represent areas whose state is changed with respect to FIG. 5. Similarly, in FIGS. 7 to 13, areas indicated by heavy-line frames in the databases JOBDB, SVDB, and SSDDB each represent an area whose state is changed with respect to the immediately-previous diagram.

First, as illustrated in FIG. 3, the management server MSV sequentially receives the jobs A1, A2, and B1 from the terminal device TM and stores the received jobs A1, A2, and B1 in the job queue JCUE. For example, the user of the information processing system SYS2 who operates the terminal device TM selects Hadoop processing by the user interface USRIF (GUI screen). Then, the user sets parameters used for execution of the Hadoop processing by the user interface USRIF. Here, the parameters are the number of namenodes, the number of datanodes, the number of tasks of map processing, the number of tasks of reduce processing, the heap size of the tasks, and so forth.

In FIG. 6, on the basis of information included in the job A1, the job allocation unit ALCT decides to use two servers SV and determines that the job A1 is a writing-dominant job. The number of servers SV caused to execute the job in a distributed manner, the type of the job (writing-dominant job or reading-dominant job), the number of memory devices SSD coupled to the respective servers SV, and the dependency relationship of the job are set by the user through the terminal device TM.

The job allocation unit ALCT refers to the databases SVDB and SSDDB and decides to use the servers SV0 and SV1 and the memory devices SSD2 and SSD3 of the writing-dominant type. Then, the job allocation unit ALCT stores information indicating the memory devices SSD2 and SSD3 to be coupled to the servers SV0 and SV1, respectively, in the area SSD-ID of the servers SV0 and SV1 in the database SVDB. Furthermore, the job allocation unit ALCT stores information indicating the servers SV0 and SV1 to be coupled to the memory devices SSD2 and SSD3, respectively, in the area SV-ID of the memory devices SSD2 and SSD3 in the database SSDDB.

Next, the job allocation unit ALCT outputs an instruction to couple the server SV0 and the memory device SSD2 and couple the server SV1 and the memory device SSD3 to the configuration change unit HWC. On the basis of the instruction from the job allocation unit ALCT, the configuration change unit HWC controls the switch control unit SWC to couple the server SV0 and the memory device SSD2 and couple the server SV1 and the memory device SSD3 through the switch device DSW. The configuration change unit HWC notifies the job allocation unit ALCT of the completion of the coupling between the server SV0 and the memory device SSD2 and the coupling between the server SV1 and the memory device SSD3. Also in the subsequent operation, when changing the state of the switch device DSW, the configuration change unit HWC notifies the job allocation unit ALCT of the completion of the change.

Figure 7:
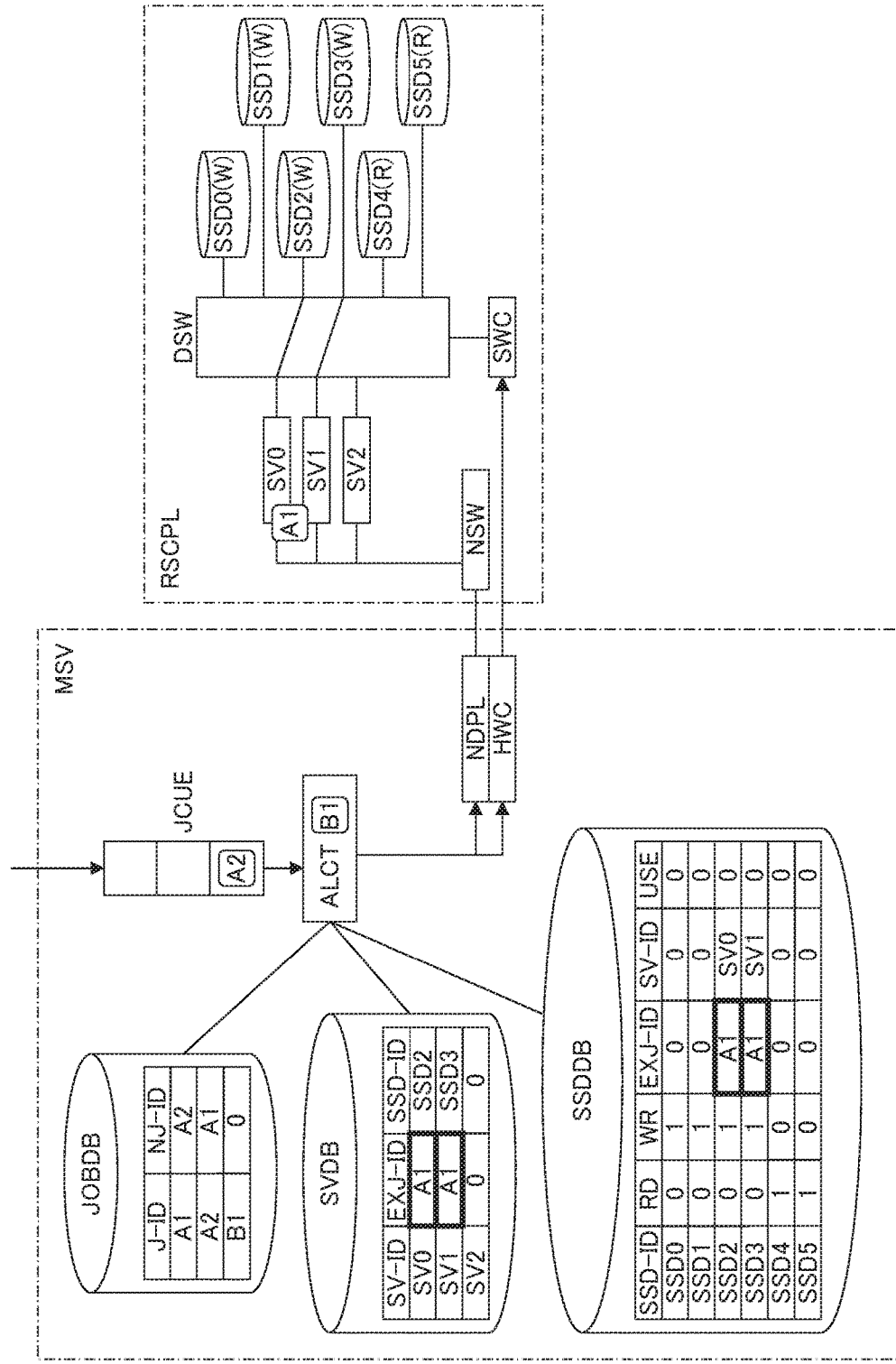

Next, in FIG. 7, the job allocation unit ALCT instructs the node deployment unit NDPL to activate the servers SV0 and SV1 and construct an environment for executing the job A1. When the environment for executing the job A1 is constructed in the servers SV0 and SV1, the job allocation unit ALCT instructs the node deployment unit NDPL to execute the job A1. The node deployment unit NDPL submits the job A1 into the servers SV0 and SV1 to cause the job A1 to be executed on the basis of the instruction from the job allocation unit ALCT.

Then, the job allocation unit ALCT stores information indicating the job A1, which is in execution by the servers SV0 and SV1, in the area EXJ-ID of the servers SV0 and SV1 in the database SVDB. The job allocation unit ALCT stores information indicating the job A1, which is in execution by the servers SV0 and SV1, in the area EXJ-ID of the memory devices SSD2 and SSD3 in the database SSDDB. Furthermore, the job allocation unit ALCT takes the job B1 from the job queue JCUE instead of the job A2 because the job A2 stored in the job queue JCUE has a dependency relationship with the job A1 in execution according to the information stored in the database JOBDB.

On the basis of information included in the job B1, the job allocation unit ALCT decides to use two servers SV and determines that the job B1 is a writing-dominant job. The job allocation unit ALCT refers to each of the databases SVDB and SSDDB and suspends execution of the job B1 until two or more servers SV become available because one server SV2 is available.

Note that FIGS. 6 to 13 illustrate an example in which the number of available servers SV is smaller than the number allowing execution of another job at the timing when one job is submitted into the servers SV for easy understanding of explanation. That is, FIGS. 6 to 13 locally represent the state in which plural jobs are submitted into the resource pool RSCPL and the number of available servers SV is insufficient. Furthermore, as described with FIG. 11, an example is represented in which the copy processing CPY can be executed by one available server SV at the timing when one job is submitted into the server SV.

Figure 8:
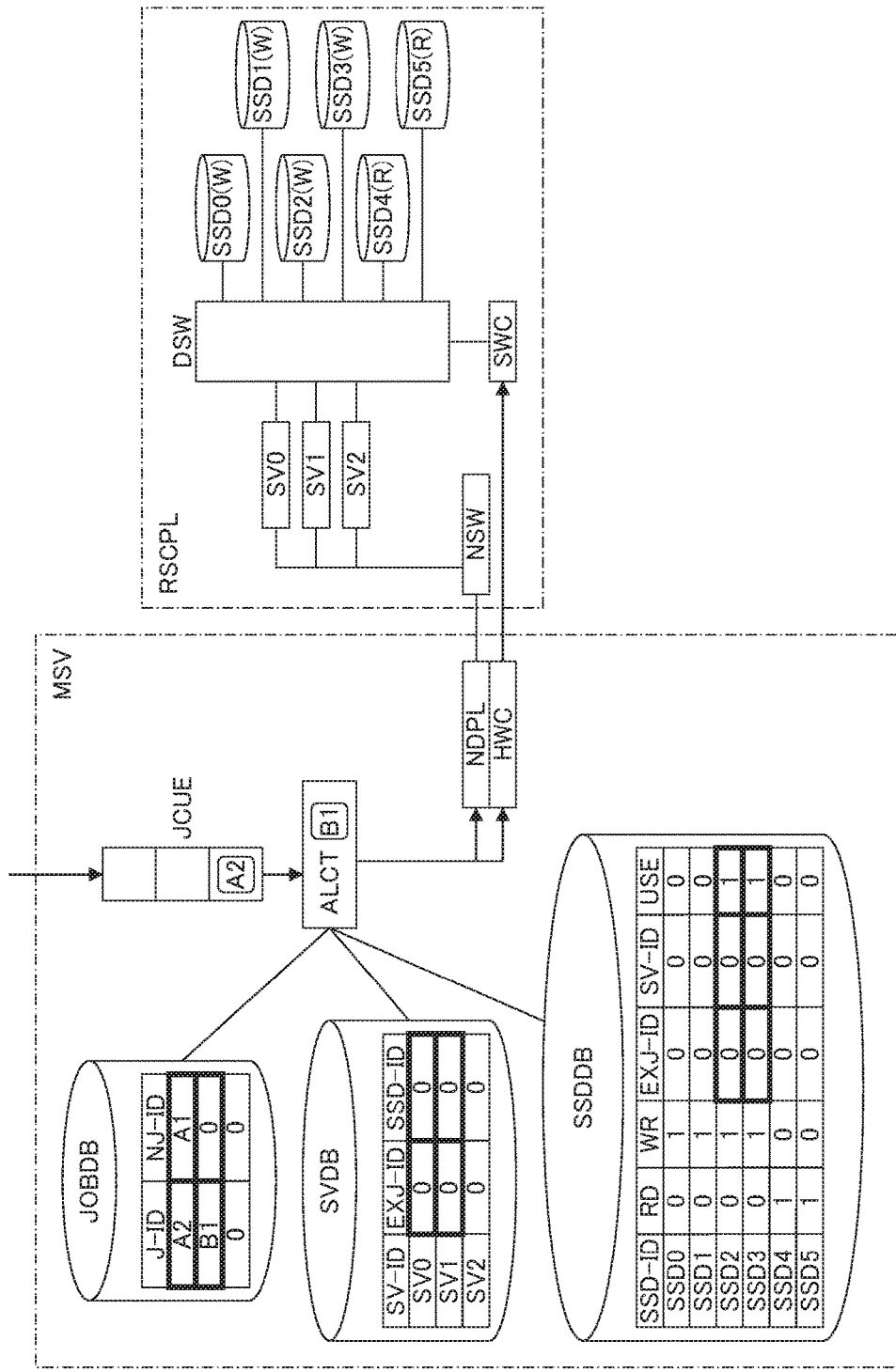

Next, in FIG. 8, the job allocation unit ALCT erases the information relating to the job A1 from the database JOBDB on the basis of the completion of the execution of the job A1. Furthermore, the job allocation unit ALCT resets the areas EXJ-ID and SSD-ID of the servers SV0 and SV1 in the database SVDB and the areas EXJ-ID and SV-ID of the memory devices SSD2 and SSD3 in the database SSDDB to "0." Moreover, by referring to the database JOBDB, the job allocation unit ALCT determines that the execution result data of the job A1 is to be used in the subsequent job A2 and may inhibit erasure of the execution result data held in the memory devices SSD2 and SSD3. Then, the job allocation unit ALCT sets the area USE of the memory devices SSD2 and SSD3 in the database SSDDB to "1" indicating that the data held in the memory devices SSD2 and SSD3 is to be used in the subsequent job. The memory device SSD in which the area USE is set to "1" may be inhibited from being accessed except for copy operation of data for executing a job having a dependency relationship.

Thereafter, the job allocation unit ALCT outputs an instruction to cut off the coupling between the server SV0 and the memory device SSD2 and cut off the coupling between the server SV1 and the memory device SSD3 to the configuration change unit HWC. On the basis of the instruction from the job allocation unit ALCT, the configuration change unit HWC controls the switch control unit SWC to cut off the coupling between the server SV0 and the memory device SSD2 and cut off the coupling between the server SV1 and the memory device SSD3 through the switch device DSW.

Figure 9:
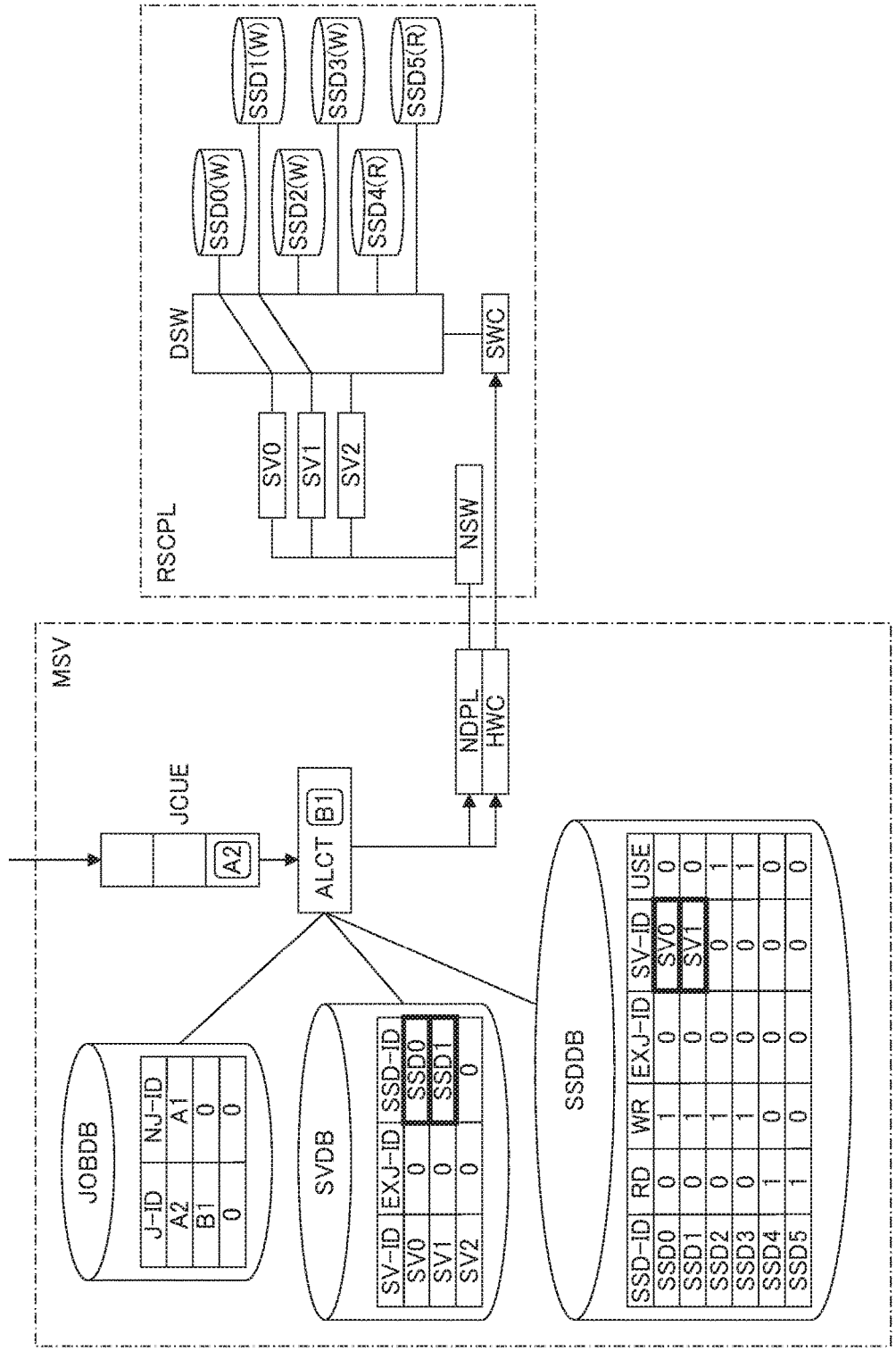

Next, in FIG. 9, the job allocation unit ALCT refers to each of the databases SVDB and SSDDB and decides to use the servers SV0 and SV1 and the memory devices SSD0 and SSD1 of the writing-dominant type for execution of the job B1. Then, the job allocation unit ALCT stores information indicating the memory devices SSD0 and SSD1 to be coupled to the servers SV0 and SV1, respectively, in the area SSD-ID of the servers SV0 and SV1 in the database SVDB. Furthermore, the job allocation unit ALCT stores information indicating the servers SV0 and SV1 to be coupled to the memory devices SSD0 and SSD1, respectively, in the area SV-ID of the memory devices SSD0 and SSD1 in the database SSDDB.

Next, the job allocation unit ALCT outputs an instruction to couple the server SV0 and the memory device SSD0 and couple the server SV1 and the memory device SSD1 to the configuration change unit HWC. On the basis of the instruction from the job allocation unit ALCT, the configuration change unit HWC controls the switch control unit SWC to couple the server SV0 and the memory device SSD0 and couple the server SV1 and the memory device SSD1 through the switch device DSW.

Figure 10:
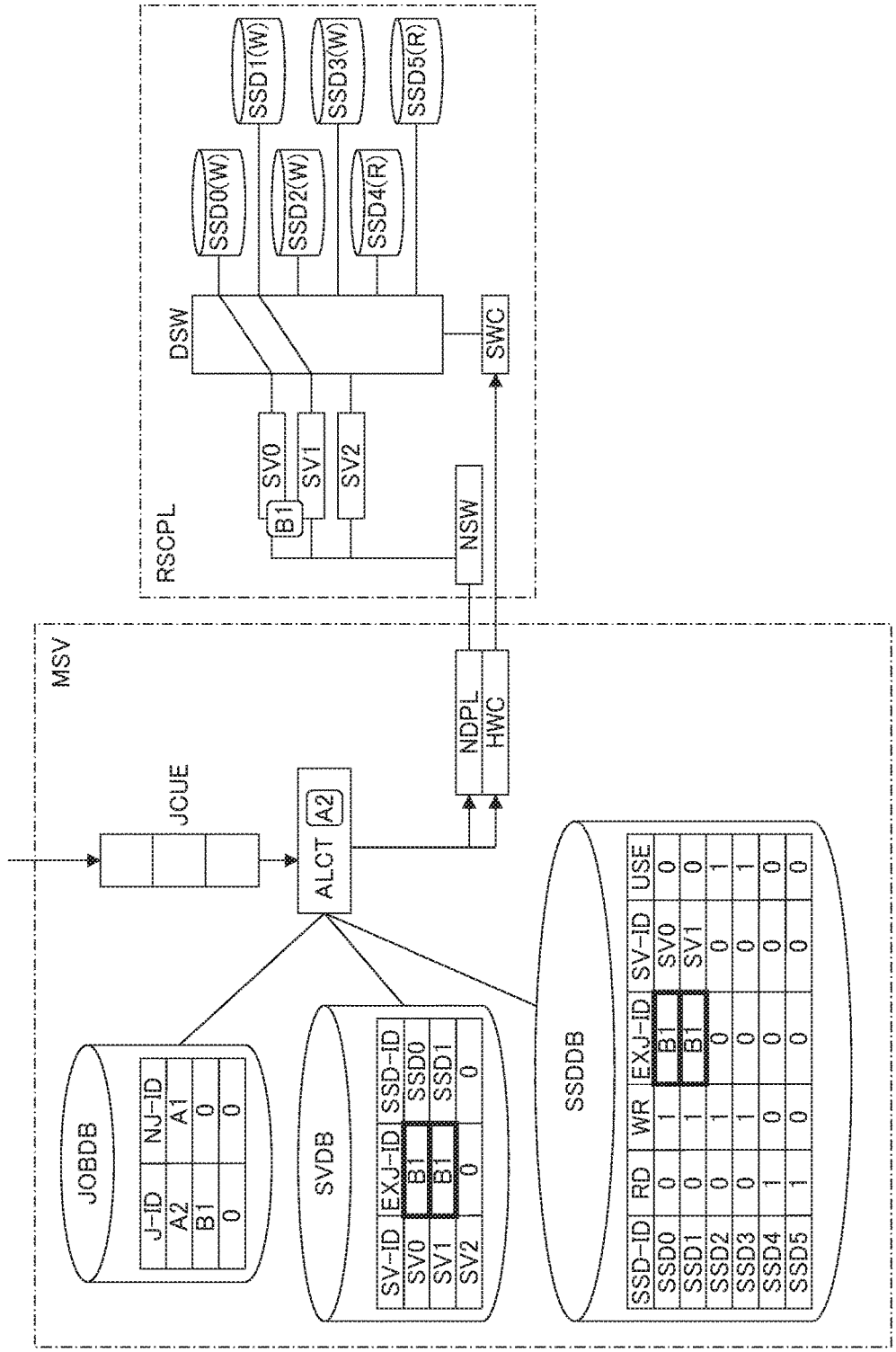

Next, in FIG. 10, the job allocation unit ALCT instructs the node deployment unit NDPL to activate the servers SV0 and SV1 and construct an environment for executing the job B1 and instructs the node deployment unit NDPL to execute the job B1. The node deployment unit NDPL constructs the environment and causes the servers SV0 and SV1 to execute the job B1 on the basis of the instructions from the job allocation unit ALCT.

The job allocation unit ALCT stores information indicating the job B1, which is in execution by the servers SV0 and SV1, in the area EXJ-ID of the servers SV0 and SV1 in the database SVDB. Furthermore, the job allocation unit ALCT stores information indicating the job B1, which is in execution by the servers SV0 and SV1, in the area EXJ-ID of the memory devices SSD0 and SSD1 in the database SSDDB. The job allocation unit ALCT refers to the database JOBDB and takes the job A2 from the job queue JCUE.

Figure 11:
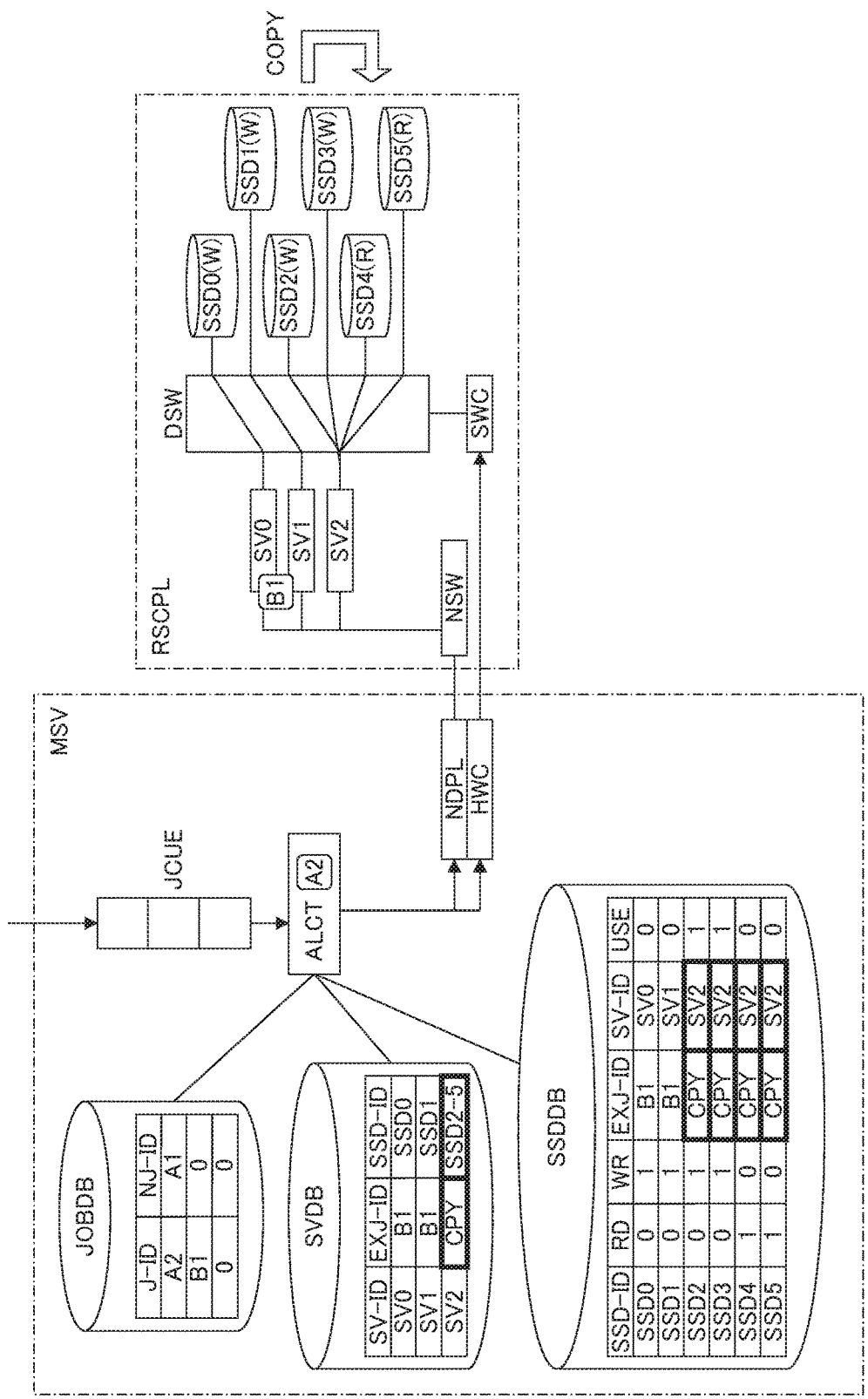

Next, in FIG. 11, the job allocation unit ALCT decides to use two servers SV and determines that the job A2 is a reading-dominant job on the basis of information included in the job A2. The job allocation unit ALCT refers to each of the databases SVDB and SSDDB and suspends execution of the job A2 until two or more servers SV become available because one server SV2 is available.

Meanwhile, the job allocation unit ALCT refers to the database JOBDB and decides to execute the job A2, which is a reading-dominant job, by using the execution result of the job A1 because the job A2 has the dependency relationship with the job A1. Moreover, the job allocation unit ALCT refers to the database SSDDB and decides to execute the job A2 by using the memory devices SSD4 and SSD5 of the reading-dominant type. Furthermore, the job allocation unit ALCT decides to copy the data held in the memory devices SSD2 and SSD3 into the memory devices SSD4 and SSD5. The job allocation unit ALCT refers to the database SVDB to search for the available server SV, and decides to use the server SV2 for the copy processing of the data.

Then, the job allocation unit ALCT stores information indicating the memory devices SSD2, SSD3, SSD4, and SSD5 to be coupled to the server SV2 in the area SSD-ID of the server SV2 in the database SVDB. Furthermore, the job allocation unit ALCT stores information indicating the server SV2 to be coupled to the memory devices SSD2 to SSD5 in the area SV-ID of the memory devices SSD2 to SSD5 in the database SSDDB.

Next, the job allocation unit ALCT outputs an instruction to couple the server SV2 and the memory devices SSD2 to SSD5 to the configuration change unit HWC. On the basis of the instruction from the job allocation unit ALCT, the configuration change unit HWC controls the switch control unit SWC to couple the server SV2 and the memory devices SSD2 to SSD5 through the switch device DSW.

Next, the job allocation unit ALCT instructs the node deployment unit NDPL to activate the server SV2 and construct an environment for copying the data from the memory devices SSD2 and SSD3 into the memory devices SSD4 and SSD5. When the environment for the copy processing is constructed in the server SV2, the job allocation unit ALCT instructs the node deployment unit NDPL to execute the copy processing. The node deployment unit NDPL causes the server SV2 to execute the copy processing on the basis of the instruction from the job allocation unit ALCT.

Then, the job allocation unit ALCT stores information CPY indicating that the copy processing is in execution in the area EXJ-ID of the server SV2 in the database SVDB. Furthermore, the job allocation unit ALCT stores the information CPY indicating that the copy processing is in execution in the area EXJ-ID of the memory devices SSD2 to SSD5 in the database SSDDB.

Figure 12:
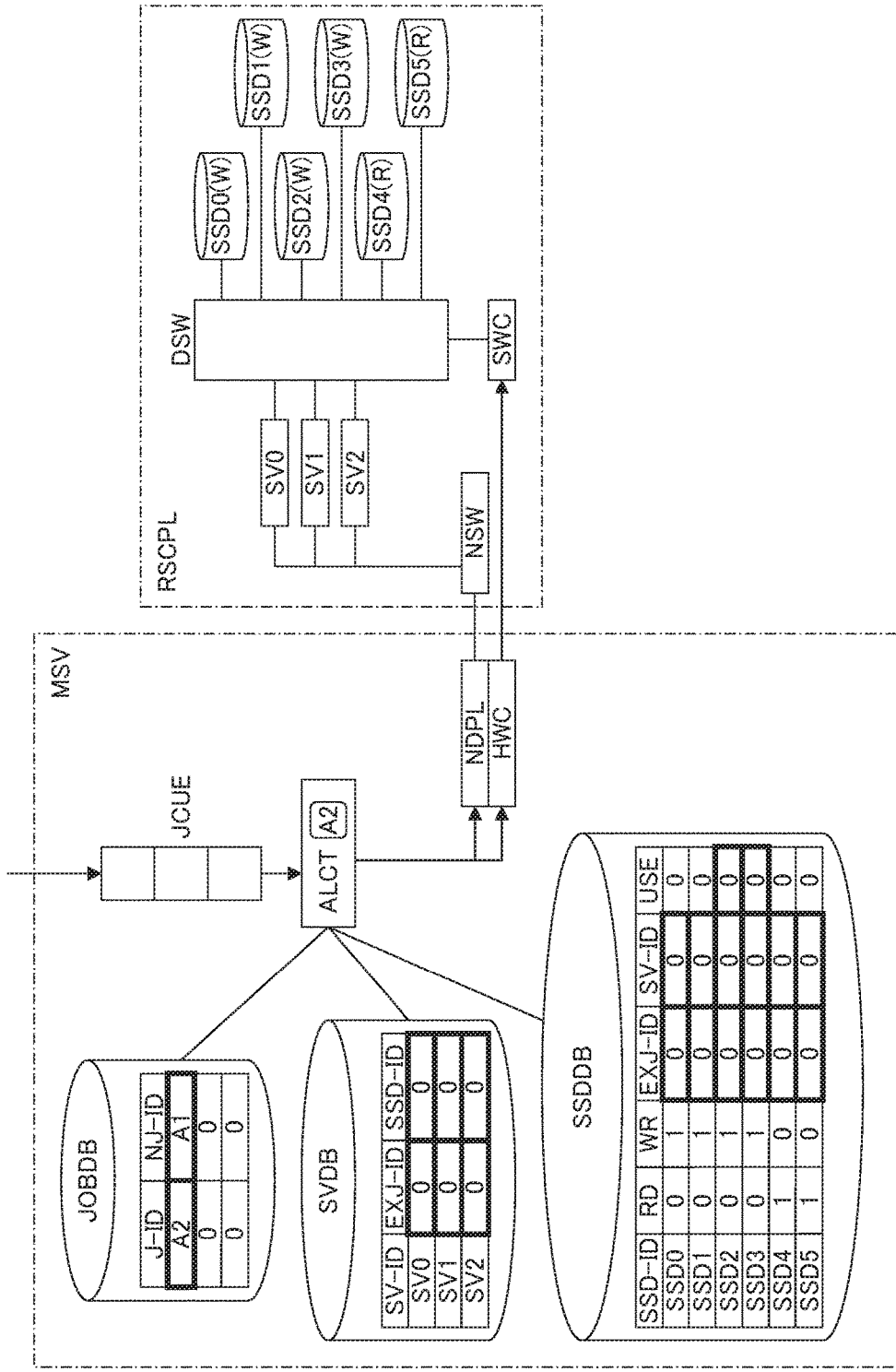

Next, in FIG. 12, the job allocation unit ALCT erases the information relating to the job B1 from the database JOBDB on the basis of the completion of the execution of the job B1. Furthermore, the job allocation unit ALCT resets the areas EXJ-ID and SSD-ID of the servers SV0 and SV1 in the database SVDB and the areas EXJ-ID and SV-ID of the memory devices SSD0 and SSD1 in the database SSDDB to "0." Thereafter, the job allocation unit ALCT outputs an instruction to cut off the coupling between the server SV0 and the memory device SSD0 and cut off the coupling between the server SV1 and the memory device SSD1 to the configuration change unit HWC.

Meanwhile, the job allocation unit ALCT resets the areas EXJ-ID and SSD-ID of the server SV2 in the database SVDB to "0" on the basis of the completion of the copy processing. Furthermore, the job allocation unit ALCT resets the areas EXJ-ID and SV-ID of the memory devices SSD2 to SSD5 in the database SSDDB to "0" on the basis of the completion of the copy processing. Thereafter, the job allocation unit ALCT outputs an instruction to cut off the coupling between the server SV2 and the memory devices SSD2 to SSD5 to the configuration change unit HWC. Furthermore, due to the completion of the copy processing, the data held in the memory devices SSD2 and SSD3 is not used in the subsequent operation. Therefore, the job allocation unit ALCT resets the area USE of the memory devices SSD2 and SSD3 in the database SSDDB to "0." Before the coupling between the server SV2 and the memory devices SSD2 and SSD3 is released, the server SV2 may be caused to execute processing of erasing the data stored in the memory devices SSD2 and SSD3.

Figure 13:
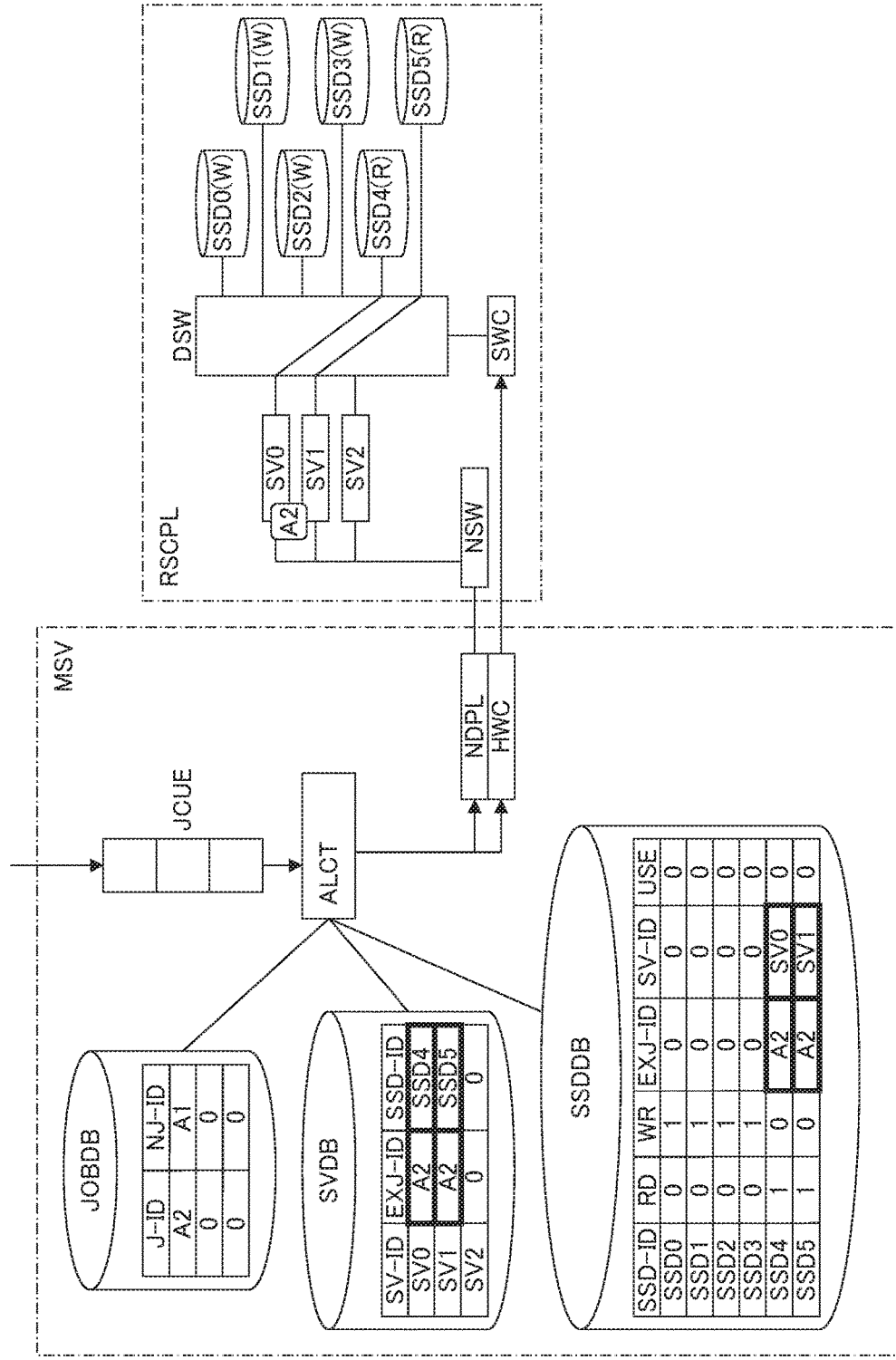

Next, in FIG. 13, the job allocation unit ALCT refers to each of the databases SVDB and SSDDB and decides to execute the job A2 by using the available servers SV0 and SV1. Then, the job allocation unit ALCT stores information indicating the memory devices SSD4 and SSD5 to be coupled to the servers SV0 and SV1, respectively, in the area SSD-ID of the servers SV0 and SV1 in the database SVDB. Furthermore, the job allocation unit ALCT stores information indicating the servers SV0 and SV1 to be coupled to the memory devices SSD4 and SSD5, respectively, in the area SV-ID of the memory devices SSD4 and SSD5 in the database SSDDB.

The job allocation unit ALCT instructs the node deployment unit NDPL to activate the servers SV0 and SV1 and construct an environment for executing the job A2. When the environment for executing the job A2 is constructed in the servers SV0 and SV1, the job allocation unit ALCT instructs the node deployment unit NDPL to execute the job A2. Thereafter, the servers SV0 and SV1 start execution of the job A2.

Then, the job allocation unit ALCT stores information indicating the job A2, which is in execution by the servers SV0 and SV1, in the area EXJ-ID of the servers SV0 and SV1 in the database SVDB. The job allocation unit ALCT stores information indicating the job A2, which is in execution by the servers SV0 and SV1, in the area EXJ-ID of the memory devices SSD4 and SSD5 in the database SSDDB.

Figure 14:
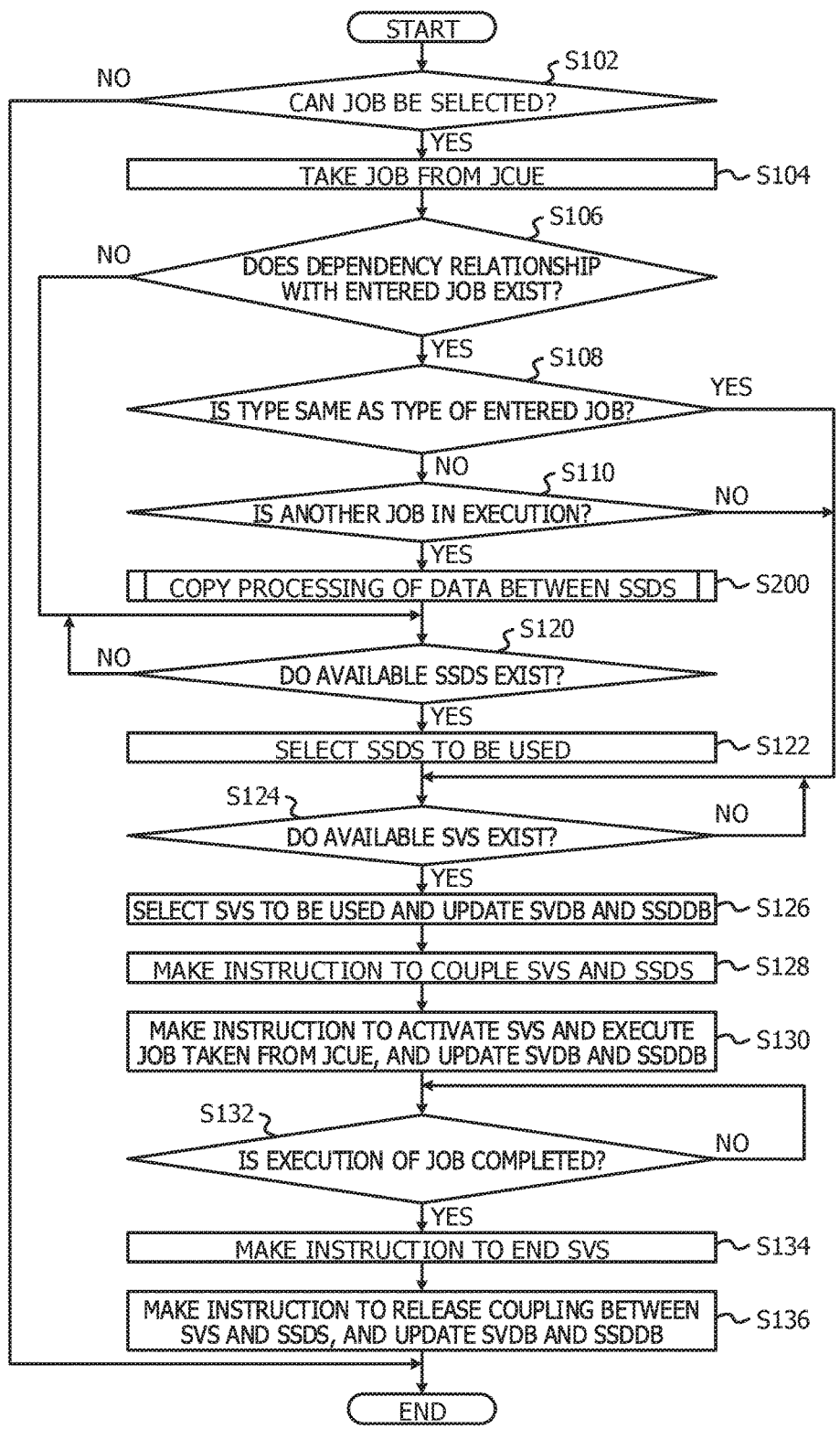
FIG. 14 illustrates one example of operation of a job allocation unit illustrated in FIG. 3.

FIG. 14 illustrates one example of operation of the job allocation unit ALCT illustrated in FIG. 3. The operation illustrated in FIG. 14 represents a control method of the information processing system SYS2 implemented by a control program executed by the management server MSV. The flow illustrated in FIG. 14 is activated at a given frequency and is executed for each job on the basis of the control program.

First, in a step S102, the job allocation unit ALCT determines whether or not a job that can be selected exists among jobs held in the job queue JCUE. If the servers SV are not executing a job, the job allocation unit ALCT determines that the oldest job held in the job queue JCUE can be selected. If the server SV is executing a job, the job allocation unit ALCT determines that the oldest job held in the job queue JCUE among jobs having no dependency relationship with the job in execution by the server SV can be selected. Furthermore, if a job having a dependency relationship with the job in execution by the server SV is held in the job queue JCUE, the job allocation unit ALCT determines that a job that can be selected does not exist. If a job that can be selected exists, the processing is shifted to a step S104. If a job that can be selected does not exist, the processing ends.

The job allocation unit ALCT takes the job to be newly executed from the job queue JCUE in the step S104 and shifts the processing to a step S106. In the step S106, the job allocation unit ALCT refers to the database JOBDB and determines whether or not a dependency relationship exists between the job taken from the job queue JCUE and a job submitted into the server SV. For example, the processing is shifted to a step S108 if the job A2 having a dependency relationship with the job A1 of which execution is completed is taken from the job queue JCUE. On the other hand, the processing is shifted to a step S120 if the job B1 having no dependency relationship with the job A1 in execution is taken from the job queue JCUE.

In the step S108, the job allocation unit ALCT determines whether or not the type of the job taken from the job queue JCUE is the same as the type of the job submitted into the server SV. For example, if the job taken from the job queue JCUE and the job of which execution is completed are both a writing-dominant job, the two jobs having the dependency relationship can be executed by using the common memory device SSD having the writing-dominant characteristic (the common memory device SSD of the writing-dominant type) and copy processing can be omitted. Therefore, the processing is shifted to a step S124. On the other hand, if the job taken from the job queue JCUE is a reading-dominant job and the job of which execution is completed is a writing-dominant job, the processing is shifted to a step S110 in order to copy execution result data of the job stored in the memory device SSD of the writing-dominant type into the memory device SSD having the reading-dominant characteristic (the memory device SSD of the reading-dominant type).

In the step S110, the job allocation unit ALCT determines whether or not another job other than a job having a dependency relationship is in execution by the server SV. For example, if another job is in execution by the server SV, the processing is shifted to a step S200 in order to execute copy processing of data between the memory devices SSD in parallel with this another job in execution. On the other hand, if another job in execution does not exist and the job taken from the job queue JCUE can be submitted, the processing is shifted to the step S124 in order to execute the job by using the memory device SSD holding the execution result data obtained by the execution of the job having the dependency relationship. That is, if it is difficult to execute the copy processing in a background, the job allocation unit ALCT causes the server SV to execute the subsequent job having the dependency relationship by using the common memory device SSD without executing the copy processing. In some cases, omitting the copy processing improves the processing efficiency of the job. An example in which a job is executed by directly using the memory device SSD holding execution result data obtained by execution of a job having a dependency relationship is illustrated in (E) of FIG. 16.

In the step S200, the job allocation unit ALCT executes the copy processing of copying the execution result data of the job held in the memory device SSD used in the job that of which execution is completed into the memory device SSD to be used in the selected job. For example, if the selected job is a reading-dominant job, the execution result data is copied from the memory device SSD of the writing-dominant type used by the server SV that has executed a writing-dominant job into the memory device SSD of the reading-dominant type.

Figure 15:
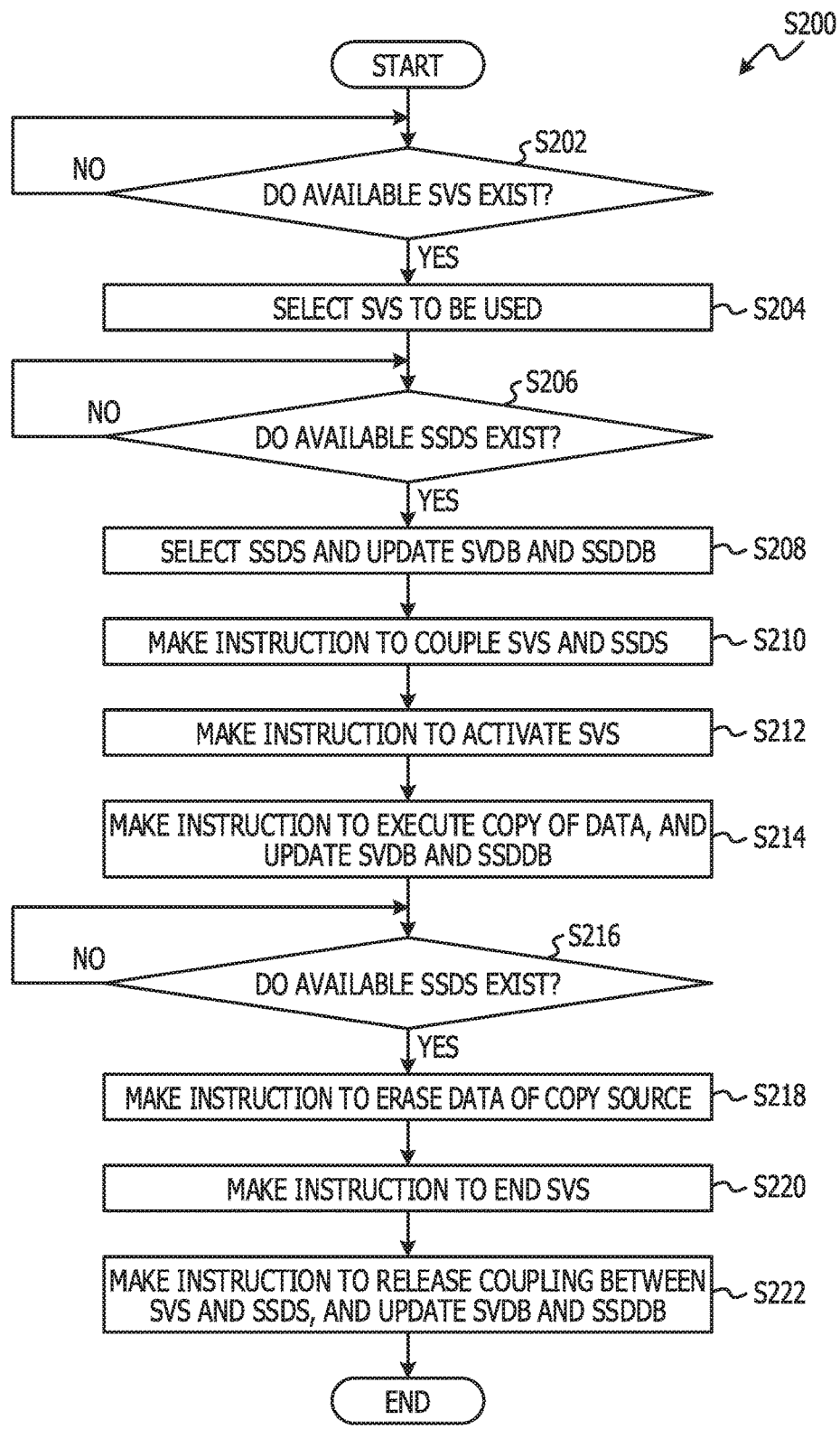
FIG. 15 illustrates one example of processing of a step S200 illustrated in FIG. 14.

If the copy processing is executed in a background of another job, the time taken for the copy processing is not included in the execution time of the job. For example, suppose that the subsequent job having the dependency relationship is a reading-dominant job. In this case, the execution result data is transferred to the memory device SSD of the reading-dominant type by the copy processing and the subsequent reading-dominant job having the dependency relationship is executed by using the memory device SSD of the reading-dominant type. Therefore, the processing efficiency of the job is improved compared with the case of executing the reading-dominant job by using the memory device SSD of the writing-dominant type as the transfer source of the execution result data. An example of the copy processing by the step S200 is illustrated in FIG. 15.

Next, in the step S120, the job allocation unit ALCT refers to the database SSDDB and determines whether or not a sufficient number of available memory devices SSD for use for the execution of the job exist. The job allocation unit ALCT shifts the processing to a step S122 if the available memory devices SSD exist, and waits until the memory devices SSD become available if the available memory devices SSD do not exist. The job allocation unit ALCT selects the memory devices SSD to be used for the execution of the job in the step S122 and shifts the processing to the step S124.

In the step S124, the job allocation unit ALCT refers to the database SVDB and determines whether or not a sufficient number of available servers SV for use for the execution of the job exist. The job allocation unit ALCT shifts the processing to a step S126 if the available servers SV exist, and waits until the servers SV become available if the available servers SV do not exist. In the step S126, the job allocation unit ALCT selects the servers SV to be used for the execution of the job and updates the area SSD-ID of the database SVDB and the area SV-ID of the database SSDDB on the basis of the selected servers SV and memory devices SSD.

Suppose that the job allocation unit ALCT holds the determination results of the steps S108 and S110 and can determine whether or not the execution of the steps S120 and S122 is possible on the basis of the held determination results. In this case, the steps S120 and S122 may be processed after the steps S124 and S126.

Next, in a step S128, the job allocation unit ALCT instructs the configuration change unit HWC to couple the memory devices SSD selected in the step S122 and the servers SV selected in the step S126. The configuration change unit HWC controls the switch control unit SWC on the basis of the instruction from the job allocation unit ALCT to couple the indicated servers SV and memory devices SSD through the switch device DSW.

Next, in a step S130, the job allocation unit ALCT instructs the node deployment unit NDPL to activate the selected servers SV and execute the job taken from the job queue JCUE. Furthermore, on the basis of the start of the execution of the job, the job allocation unit ALCT updates the areas EXJ-ID of the databases SVDB and SSDDB. On the basis of the instruction from the job allocation unit ALCT, the node deployment unit NDPL activates the indicated servers SV and constructs an environment for executing the job. Then, the node deployment unit NDPL submits the job into the activated servers SV.

Next, the job allocation unit ALCT waits for the completion of the execution of the job in a step S132, and shifts the processing to a step S134 when the execution of the job is completed. The job allocation unit ALCT instructs the node deployment unit NDPL to end (shut down or the like) the operation of the servers SV that were executing the completed job in the step S134 and shifts the processing to a step S136. The node deployment unit NDPL ends the operation of the indicated servers SV on the basis of the instruction from the job allocation unit ALCT. If a preceding job having a dependency relationship is completed, the job allocation unit ALCT updates the area USE of the database SSDDB to allow recognition of that the data stored in the memory devices SSD is to be used in a subsequent job.

In the step S136, the job allocation unit ALCT instructs the configuration change unit HWC to release the coupling between the servers SV and the memory devices SSD coupled in the step S128, followed by the end of the processing. Furthermore, on the basis of the completion of the execution of the job, the job allocation unit ALCT updates the areas EXJ-ID and SSD-ID of the database SVDB and the areas EXJ-ID and SV-ID of the database SSDDB. Moreover, if the job of which execution is completed has a dependency relationship with a subsequent job, the job allocation unit ALCT updates the area USE of the database SSDDB. The configuration change unit HWC controls the switch control unit SWC on the basis of the instruction from the job allocation unit ALCT to release the coupling between the indicated servers SV and memory devices SSD through the switch device DSW.

FIG. 15 illustrates one example of processing of the step S200 illustrated in FIG. 14. First, in a step S202, the job allocation unit ALCT refers to the database SVDB and determines whether or not a sufficient number of available servers SV for use for copy processing exist. The job allocation unit ALCT shifts the processing to a step S204 if the available servers SV exist, and waits until the servers SV become available if the available servers SV do not exist.

The job allocation unit ALCT selects the servers SV to be used for the copy processing in the step S204 and shifts the processing to a step S206. In the step S206, the job allocation unit ALCT refers to the database SSDDB and determines whether or not the available memory devices SSD to which data is written by the copy processing exist. The job allocation unit ALCT shifts the processing to a step S208 if the available memory devices SSD exist, and waits until the memory devices SSD become available if the available memory devices SSD do not exist.

In the step S208, the job allocation unit ALCT selects the memory devices SSD to be used for the copy processing and updates the area SSD-ID of the database SVDB and the area SV-ID of the database SSDDB. Then, the job allocation unit ALCT shifts the processing to a step S210.

In the step S210, the job allocation unit ALCT instructs the configuration change unit HWC to couple the servers SV selected in the step S204 and the memory devices SSD selected in the step S208. The configuration change unit HWC controls the switch control unit SWC on the basis of the instruction from the job allocation unit ALCT to couple the indicated servers SV and memory devices SSD through the switch device DSW.

Next, in a step S212, the job allocation unit ALCT instructs the node deployment unit NDPL to activate the selected servers SV. On the basis of the instruction from the job allocation unit ALCT, the node deployment unit NDPL activates the indicated servers SV and constructs an environment for executing the copy processing.

In a step S214, the job allocation unit ALCT instructs the servers SV to execute the copy processing through the node deployment unit NDPL and updates the areas EXJ-ID of the databases SVDB and SSDDB. Next, the job allocation unit ALCT waits for the completion of the copy processing in a step S216 and shifts the processing to a step S218 when the copy processing is completed.

The job allocation unit ALCT instructs the node deployment unit NDPL to erase the data held in the memory devices SSD of the copy source in the step S218 and shifts the processing to a step S220. Furthermore, the job allocation unit ALCT updates the area USE of the database SSDDB in association with the erasure of the data. The node deployment unit NDPL erases the data held in the memory devices SSD of the copy source on the basis of the instruction from the job allocation unit ALCT.

The job allocation unit ALCT instructs the node deployment unit NDPL to end (shut down or the like) the operation of the servers SV that were executing the copy processing in the step S220 and shifts the processing to a step S222. The node deployment unit NDPL ends the operation of the indicated servers SV on the basis of the instruction from the job allocation unit ALCT.

In the step S222, the job allocation unit ALCT instructs the configuration change unit HWC to release the coupling between the servers SV and the memory devices SSD coupled in the step S210, followed by the end of the processing. Furthermore, on the basis of the completion of the copy processing, the job allocation unit ALCT updates the areas EXJ-ID and SSD-ID of the database SVDB and the areas EXJ-ID and SV-ID of the database SSDDB. The configuration change unit HWC controls the switch control unit SWC on the basis of the instruction from the job allocation unit ALCT to release the coupling between the indicated servers SV and memory devices SSD through the switch device DSW.

FIGS. 16A, 16B, 16C, 16D, 16E, and 16F each illustrate one example of jobs executed by the information processing system SYS2 illustrated in FIG. 3. Jobs A1, A2, and B1 are the jobs A1, A2, and B1 explained with FIGS. 3 to 13. The jobs A1 and B1 are writing-dominant jobs and the job A2 is a reading-dominant job. The job A2 has a dependency relationship with the job A1 and is executed by using the execution result of the job A1. The job B1 may be a reading-dominant job. In this case, the job B1 is executed using the memory device SSD(R). The job A1 is started at timing t0 and the jobs B1, A2, and so forth are executed after the execution of the job A1.

Figure 16:
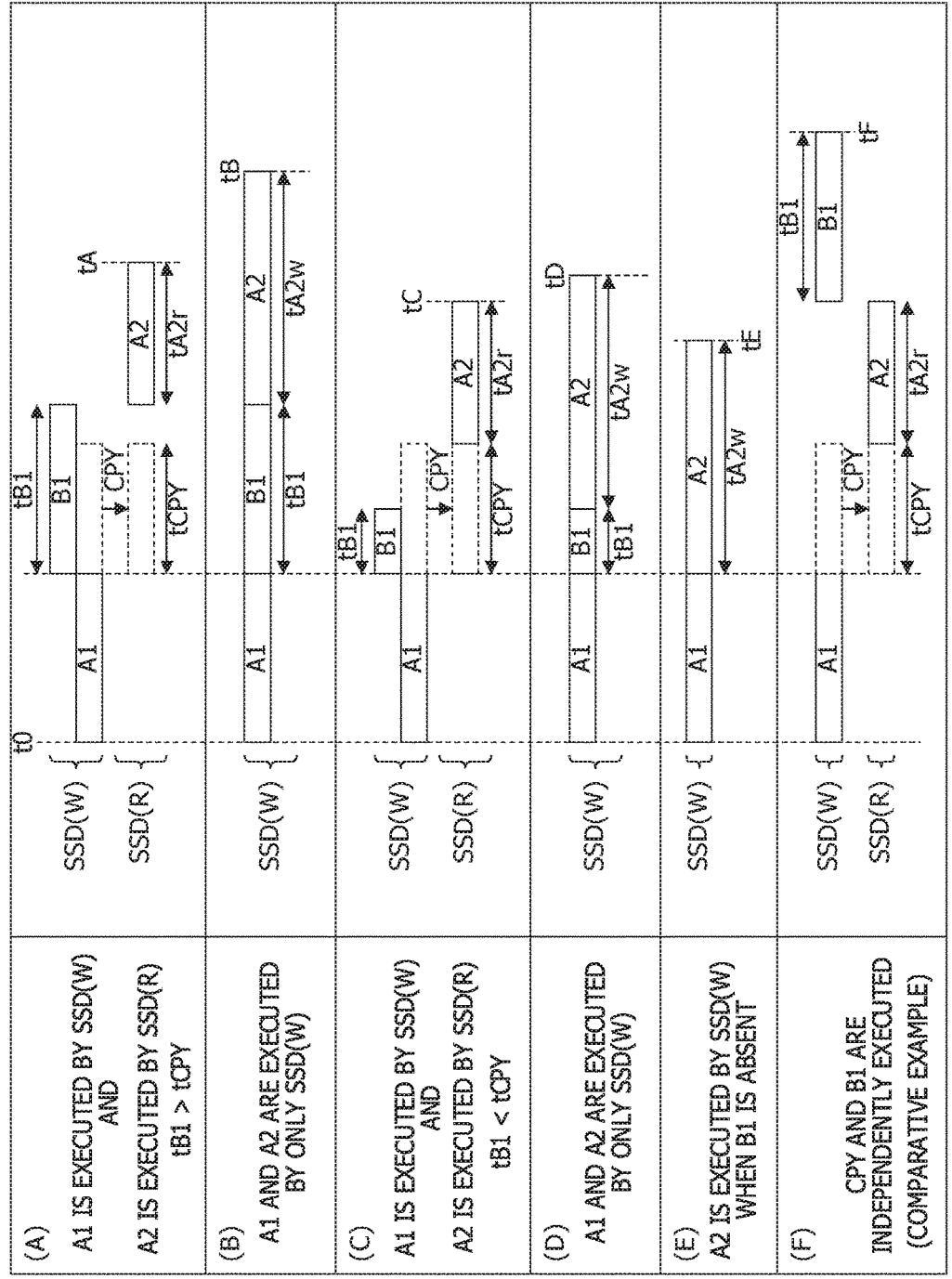
FIG. 16 illustrates one example of jobs executed by the information processing system illustrated in FIG. 3.

FIGS. 16A and 16C illustrate the jobs A1, B1, and A2 executed by the operation represented in FIGS. 6 to 13. The copy processing CPY of copying the execution result of the job A1 from the memory device SSD(W) to the memory device SSD(R) is executed in parallel with the processing of the job B1. (A) of FIG. 16 illustrates an example in which execution time tB1 of the job B1 is longer than execution time tCPY of the copy processing CPY and (C) of FIG. 16 illustrates an example in which the execution time tB1 of the job B1 is shorter than the execution time tCPY of the copy processing CPY.

FIGS. 16B and 16D illustrate an example in which the jobs A1, A2, and B1 are executed by using the memory device SSD(W) of the writing-dominant type. In FIGS. 16B and 16D, the job A2 is executed by using the memory device SSD(W) holding the execution result of the job A1 and therefore the copy processing CPY does not occur. However, because the job A2 is a reading-dominant job, execution time tA2w of the job A2 executed by using the memory device SSD(W) is longer than execution time tA2r of the job A2 executed by using the memory device SSD(R).

As illustrated in (A) of FIG. 16, if the execution time tB1 of the job B1 is longer than the execution time tCPY of the copy processing CPY, the execution time of the copy processing CPY is hidden by the execution time tB1 of the job B1. Furthermore, the execution time tA2r of the job A2 is shortened compared with the execution time tA2w of the job A2 illustrated in (B) of FIG. 16. As a result, time to represented in (A) of FIG. 16 at which the processing of the jobs A1, A2, and B1 is completed is earlier than time tB represented in (B) of FIG. 16 at which the processing of the jobs A1, A2, and B1 is completed.

On the other hand, if the execution time tB1 is shorter than the execution time tCPY, time tC represented in (C) of FIG. 16 at which the processing of the jobs A1, A2, and B1 is completed is earlier than time tD represented in (D) of FIG. 16 at which the processing of the jobs A1, A2, and B1 is completed under the following condition.

(Condition) The sum of the execution time tCPY and the execution time tA2r of the job A2 executed by using the memory device SSD(R), represented in (C) of FIG. 16, is shorter than the sum of the execution time tB1 of the job B1 and the execution time tA2w of the job A2 executed by using the memory device SSD(W), represented in (D) of FIG. 16.

By interchanging SSD(W) and SSD(R) in FIGS. 16A to 16D, examples of a case in which the job A2 as a writing-dominant job is executed by using the processing result of the job A1 as a reading-dominant job are represented. Also in this case, the jobs A1 and A2 having the dependency relationship are executed by using the memory devices SSD of the different types through the execution of the copy processing CPY, which can advance the time at which the processing of the jobs A1, A2, and B1 is completed.

(E) of FIG. 16 illustrates an example in which the job B1 is not held in the job queue JCUE and the jobs A1 and A2 are sequentially executed. In this case, as described about the step S110 in FIG. 14, the job A2 as a reading-dominant job is executed by using the execution result data of the job A1 stored in the memory device SSD of the writing-dominant type. Thus, the execution time tA2w of the job A2 is longer than the execution time tA2r when the job A2 is executed by using the memory device SSD of the reading-dominant type. However, if the execution time tA2w of the job A2 is shorter than the sum of the execution time tCPY and execution time tA2r represented in (C) of FIG. 16, time tE at which the processing of the last job A2 is completed is earlier than the time tC illustrated in (C) of FIG. 16, at which the processing of the last job A2 is completed.

On the other hand, if the execution time tA2w of the job A2 is longer than the sum of the execution time tCPY and execution time tA2r represented in (C) of FIG. 16, it is preferable that the job A2 is executed by using the memory device SSD of the reading-dominant type into which execution result data has been copied by the copy processing CPY. For this reason, if the time tE at which the processing of the job A2 is completed is later than the time tC, the job allocation unit ALCT may shift the processing to the step S200 at the step S110 in FIG. 14.

(F) of FIG. 16 illustrates a comparative example in which the copy processing CPY and the job B1 are independently executed. If the copy processing CPY and the job B1 are independently executed, time tF at which the processing of the jobs A1, A2, and B1 is completed includes the sum of the execution time tCPY, execution time tA2r, and execution time tB1 and therefore is later than the time tA of (A) of FIG. 16 and the time tC of (C) of FIG. 16.

As above, also in the embodiment illustrated in FIGS. 3 to 16, similarly to the embodiment illustrated in FIGS. 1 and 2, the time until the completion of the execution of the jobs A1, A2, and B1 is shortened compared with conventional configurations and the processing efficiency of the jobs A1, A2, and B1 is improved compared with conventional configurations. As a result, the performance of the information processing system SYS2 is improved compared with conventional configurations.

Moreover, in the embodiment illustrated in FIGS. 3 to 16, the management server MSV includes the database JOBDB including the area NJ-ID, in which the dependency relationships between jobs are stored. Due to this, through reference to the database JOBDB by the job allocation unit ALCT, the dependency relationships of jobs held in the job queue JCUE are recognized and submitting of the job or suspension of submitting are determined on the basis of the recognition result.

The management server MSV includes the database SSDDB including the areas RD and WR, which store the type of the memory devices SSD. Due to this, through reference to the database SSDDB by the job allocation unit ALCT, the memory device SSD coupled to the server SV is selected in accordance with the type of a job (writing-dominant job or reading-dominant job).

The management server MSV includes the database SSDDB including the area USE indicating that data to be used in a subsequent job having a dependency relationship is stored in the memory device SSD. Due to this, the memory device SSD that stores data to be used in a subsequent job having a dependency relationship may be inhibited from being used in another job. As a result, the data to be used in a subsequent job having a dependency relationship may be inhibited from being lost from the memory device SSD.

If a subsequent job having a dependency relationship can be executed by the server SV, the job allocation unit ALCT causes the server SV to execute the subsequent job having the dependency relationship by using the common memory device SSD without executing the copy processing. This further improves the processing efficiency of the job.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A system comprising:
a plurality of calculation nodes;
a plurality of input-output devices including a first input-output device having a first input-output characteristic and a second input-output device having a second input-output characteristic, each of the plurality of input-output devices being coupled to one of the plurality of calculation nodes; and
a control device including a memory and a processor, wherein
the memory is configured to store a plurality of jobs, and
the processor is configured to:
when the plurality of jobs include a first job in which a ratio between reading and writing included in the first job is more suitable for the first input-output characteristic than the second input-output characteristic, a second job that has a dependency relationship with the first job and in which a ratio between reading and writing included in the second job is more suitable for the second input-output characteristic than the first input-output characteristic, and a third job having a dependency relationship with neither the first job nor the second job,
submit the first job into a first calculation node among the plurality of calculation nodes after executing control to couple the first input-output device and the first calculation node,
submit the third job ahead of the second job into a second calculation node among the plurality of calculation nodes after completion of execution of the first job,
execute control to couple the first input-output device and the second input-output device,
execute control to copy execution result data that is stored in the first input-output device and is obtained by the execution of the first job into the second input-output device,
execute control to couple the second input-output device and a third calculation node among the plurality of calculation nodes, and
submit the second job into the third calculation node after completion of execution of the third job.

2. The system according to claim 1, wherein
the first input-output characteristic is one of a reading-dominant characteristic in which reading performance is higher than writing performance and a writing-dominant characteristic in which writing performance is higher than reading performance, and
the second input-output characteristic is the other of the reading-dominant characteristic and the writing-dominant characteristic.

3. The system according to claim 1, wherein
the control device is configured to store dominance information to identify one of the reading-dominant characteristic and the writing-dominant characteristic about each of the plurality of input-output devices.

4. The system according to claim 1, wherein
the control device is configured to store data holding information to recognize that execution result data obtained by execution of a job is stored about each of the plurality of input-output devices.

5. The system according to claim 1, wherein
the control device is configured to store dependency relationship information representing dependency relationships among the plurality of jobs.

6. The system according to claim 1, wherein
the processor is configured to submit the second job into the first calculation node after the completion of the execution of the first job when a job submitted subsequent to the first job does not exist except for the second job.

7. The system according to claim 1, wherein
the memory of the control device is configured to sequentially store the first job, the second job, and the third job.

8. The system according to claim 1, wherein
the processor is configured to submit, as a first-submitted job, a job stored in the memory first among the plurality of jobs.

9. The system according to claim 1, further comprising
a switching device that switches coupling between the plurality of calculation nodes and the plurality of input-output devices based on an instruction from the processor.

10. The system according to claim 1, wherein
the first input-output device and the second input-output device are each a solid state drive device including a semiconductor memory element.

11. A control device in a system including a plurality of calculation nodes and a plurality of input-output devices, the plurality of input-output devices including a first input-output device having a first input-output characteristic and a second input-output device having a second input-output characteristic, each of the plurality of input-output devices being coupled to one of the plurality of calculation nodes, the control device comprising:
a memory configured to store a plurality of jobs; and
a processor coupled to the memory and configured to:
when the plurality of jobs include a first job in which a ratio between reading and writing included in the first job is more suitable for the first input-output characteristic than the second input-output characteristic, a second job that has a dependency relationship with the first job and in which a ratio between reading and writing included in the second job is more suitable for the second input-output characteristic than the first input-output characteristic, and a third job having a dependency relationship with neither the first job nor the second job,
submit the first job into a first calculation node among the plurality of calculation nodes after executing control to couple the first input-output device and the first calculation node,
submit the third job ahead of the second job into a second calculation node among the plurality of calculation nodes after completion of execution of the first job,
execute control to couple the first input-output device and the second input-output device,
execute control to copy execution result data that is stored in the first input-output device and is obtained by the execution of the first job into the second input-output device, execute control to couple the second input-output device and a third calculation node among the plurality of calculation nodes, and submit the second job into the third calculation node after completion of execution of the third job.

12. The control device according to claim 11, wherein the first input-output characteristic is one of a reading-dominant characteristic in which reading performance is higher than writing performance and a writing-dominant characteristic in which writing performance is higher than reading performance, and the second input-output characteristic is the other of the reading-dominant characteristic and the writing-dominant characteristic.

13. The control device according to claim 11, further comprising:

a second memory configured to store dominance information to identify one of the reading-dominant characteristic and the writing-dominant characteristic about each of the plurality of input-output devices.

14. The control device according to claim 11, further comprising:

a second memory configured to store data holding information to recognize that execution result data obtained by execution of a job is stored about each of the plurality of input-output devices.

15. The control device according to claim 11, further comprising:

a second memory configured to store dependency relationship information representing dependency relationships among the plurality of jobs.

16. The control device according to claim 11, wherein the processor is configured to submit the second job into the first calculation node after the completion of the execution of the first job when a job submitted subsequent to the first job does not exist except for the second job.

17. The control device according to claim 11, wherein the memory is configured to sequentially store the first job, the second job, and the third job.

18. The control device according to claim 11, wherein the processor is configured to submit, as a first-submitted job, a job stored in the memory first among the plurality of jobs.

19. The control device according to claim 11, wherein the first input-output device and the second input-output device are each a solid state drive device including a semiconductor memory element.

20. A method executed in a system including a plurality of calculation nodes, a plurality of input-output devices, and a control device including a memory, the plurality of input-output devices including a first input-output device having a first input-output characteristic and a second input-output device having a second input-output characteristic, each of the plurality of input-output devices being coupled to one of the plurality of calculation nodes, the method comprising:

storing a first job in which a ratio between reading and writing included in the first job is more suitable for the first input-output characteristic than the second input-output characteristic into the memory;

storing a second job that has a dependency relationship with the first job and in which a ratio between reading and writing included in the second job is more suitable for the second input-output characteristic than the first input-output characteristic into the memory;

storing a third job having a dependency relationship with neither the first job nor the second job into the memory;

coupling the first input-output device and the first calculation node;

submitting the first job into a first calculation node among the plurality of calculation nodes;

submitting the third job ahead of the second job into a second calculation node among the plurality of calculation nodes after completion of execution of the first job by the first calculation node;

coupling the first input-output device and the second input-output device;

copying execution result data that is stored in the first input-output device and is obtained by the execution of the first job into the second input-output device;

coupling the second input-output device and a third calculation node among the plurality of calculation nodes; and submitting the second job into the third calculation node after completion of execution of the third job by the second calculation node.

* * * * *